United States Patent
Cheshire et al.

(10) Patent No.: US 12,204,828 B2
(45) Date of Patent: Jan. 21, 2025

(54) THREE-DIMENSIONAL (3D) MODELING SYSTEMS AND METHODS FOR AUTOMATICALLY GENERATING PHOTOREALISTIC, VIRTUAL 3D PACKAGE AND PRODUCT MODELS FROM 3D AND TWO-DIMENSIONAL (2D) IMAGING ASSETS

(71) Applicant: The Procter & Gamble Company, Cincinnati, OH (US)

(72) Inventors: Diana Jobson Cheshire, Wyoming, OH (US); David A Lombardi, Jr., Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 402 days.

(21) Appl. No.: 16/941,689

(22) Filed: Jul. 29, 2020

(65) Prior Publication Data
US 2022/0035970 A1    Feb. 3, 2022

(51) Int. Cl.
*G06F 30/23*    (2020.01)
*G06F 30/12*    (2020.01)

(52) U.S. Cl.
CPC .............. *G06F 30/23* (2020.01); *G06F 30/12* (2020.01)

(58) Field of Classification Search
CPC .............. G06F 2111/20; G06F 2113/10; G06F 2113/20; G06F 30/10; G06F 30/12; G06F 30/23
See application file for complete search history.

(56) References Cited

U.S. PATENT DOCUMENTS

| 6,907,310 B2 | 6/2005 | Gardner |
| 7,920,144 B2 | 4/2011 | Vogt |

(Continued)

FOREIGN PATENT DOCUMENTS

| CA | 2347290 C | 10/2006 |
| FR | 2828572 A1 | 2/2003 |

(Continued)

OTHER PUBLICATIONS

All Office Actions; U.S. Appl. No. 17/392,331, filed on Aug. 3, 2021.

(Continued)

*Primary Examiner* — Nithya J. Moll
(74) *Attorney, Agent, or Firm* — Anna E. Haller; Angela K. Haughey

(57) ABSTRACT

Three-dimensional (3D) modeling systems and methods are described for automatically generating photorealistic, virtual 3D package and product models from 3D and two-dimensional (2D) imaging assets. The 3D modeling systems and methods include loading, into a memory with one or more processors, computer-aided design (CAD) component(s) and assembling, with an automatic imaging asset assembly script, the CAD component(s) to create a parametric-based CAD model. A polygonal model of a real-world product or product package is generated based on the parametric-based CAD model. Digital surface finish artifact(s) of a virtual material library, as selected from the 2D imaging assets, are applied to the polygonal model. A virtual 3D model is generated based on the polygonal model and a UV coordinate mapping corresponding to a virtual product label, and rendered, via a graphical display, as a photorealistic image representing the real-world product or product package.

20 Claims, 19 Drawing Sheets

(56) References Cited

U.S. PATENT DOCUMENTS

| | | |
|---|---|---|
| 8,570,343 B2 | 10/2013 | Halstead |
| 9,470,911 B2 | 10/2016 | Fonte |
| 9,734,634 B1 | 8/2017 | Mott |
| 10,013,801 B2 | 7/2018 | Mehr |
| 10,043,315 B2 | 8/2018 | Meier |
| 10,191,541 B2 | 1/2019 | Chen |
| 10,235,810 B2 | 3/2019 | Morrison |
| 2002/0123812 A1 | 9/2002 | Jayaram |
| 2009/0044136 A1 | 2/2009 | Flider |
| 2011/0254840 A1 | 10/2011 | Halstead |
| 2013/0066750 A1 | 3/2013 | Siddique |
| 2013/0218714 A1 | 8/2013 | Watkins |
| 2014/0081701 A1 | 3/2014 | Lakshminarayanan |
| 2014/0095122 A1 | 4/2014 | Appleman |
| 2016/0012629 A1* | 1/2016 | Jennings ............... G06T 19/00 345/420 |
| 2016/0210602 A1 | 7/2016 | Siddique |
| 2016/0370971 A1 | 12/2016 | Hackett |
| 2017/0061037 A1 | 3/2017 | Makem |
| 2017/0132836 A1 | 5/2017 | Iverson |
| 2018/0330480 A1 | 11/2018 | Liu |
| 2019/0035165 A1 | 1/2019 | Gausebeck |
| 2019/0043302 A1 | 2/2019 | Lyons |
| 2019/0114699 A1* | 4/2019 | Cook ............... G06Q 30/0621 |
| 2019/0261024 A1 | 8/2019 | Livshitz |
| 2020/0159871 A1* | 5/2020 | Bowen ................ G06V 40/10 |
| 2020/0334741 A1* | 10/2020 | Lynn .................... G06F 3/1423 |
| 2022/0084296 A1 | 3/2022 | Sadalgi |

FOREIGN PATENT DOCUMENTS

| | | |
|---|---|---|
| WO | 2009026726 A1 | 3/2009 |
| WO | 2019126869 A1 | 7/2019 |

OTHER PUBLICATIONS

U.S. Appl. No. 17/392,331, filed on Aug. 3, 2021, to Rachel Wiley et. al.

15848 PCT Search Report and Written Opinion for PCT/US2021/041768 dated Nov. 4, 2021, 21 pages.

AngryAntChannel: Tutorial: Photorealistic Label Texture, Youtube, Feb. 11, 2018 (Feb. 11, 2018), p. 1 pp., XP054982372, Retrieved from the Internet: URL:https://www.youtube.com/watch?v=8g3slvCXuRY [retrieved on Oct. 21, 2021] 3:50 to 4:20 4:45.

Anonymous: "Liv mapping—Wikipedia", Jun. 26, 2020 (Jun. 26, 2020), pp. 1-3, XP055853843, Retrieved from the Internet:URL:https://en.wikipedia.org/w/index.php?tl ti e=U V_mappi ng&ol di d=964608446 [retrieved on Oct. 21, 2021] the whole document section "UV unwrapping" links on last page.

JustFusion—3d Tutorial: "How to Add Any Texture to Model in Autodesk Fusion 360120191 Extra Features", Youtube, Nov. 29, 2019 (Nov. 29, 2019), p. 1 pp., XP054982382, Retrieved from the Internet: URL: https://www.youtube.com/watch?v=mRri DeV EJ Zg [retrieved on Oct. 22, 2021] the whole document 4:16 to 4:24 3:48 to 4:00.

Lars Christensen: "Fusion 360 Tutorial for Absolute Beginners—Part 1", Youtube, Dec. 20, 2016 (Dec. 20, 2016), p. 1 pp., XP054982380, Retrieved from the Internet: URL: https://www.youtube.com/watch?vA5bc9c3S12g [retrieved on Oct. 22, 2021] the whole document 0:16 13:10 to 13:20.

Lars Christensen: "Fusion 360 Tutorial for Absolute Beginners—Part 3", Youtube, Dec. 20, 2016 (Dec. 20, 2016), p. 1 pp., XP054982384, Retrieved from the Internet:URL:https://www.youtube.com/watch?v=zS8dYA lluc[retrieved on Oct. 22, 2021] the whole document 8:00 to 9:10 14:25.

Lars Christensen: "Go From Fusion 360 to 3D Printer—Tutorial—#LarsLive 180", Youtube, Jun. 28, 2018 (Jun. 28, 2018), p. 1 pp., XP054982381, Retrieved from the Internet: URL: https://www.youtube.com/watch?v=x-9gOjoZ29k [retrieved on Oct. 22, 2021] the whole document 0:43 5:20 to 6:50.

Du et al., "Interactie 3D Modeling of Indoor Environments with a Consumer Depth Camera", 2011, 10 pgs.

Hagbi et al., "Shape Recognition and Pose Estimation for Mobile Augmented Reality", IEEE Transactions on Visualization and Computer Graphics, vol. 17, No. 10, Oct. 2011, pp. 1369-1379.

Hauswiesner et al., "Virtual Try-On through Image-Based Rendering", IEEE Transactions on Visualization and Computer Graphics, vol. 19, No. 9, Sep. 2013, pp. 1552-1565.

Kartsounis et al., "10.E-Tailor: Integration of 3D Scanners, CAD and Virtual-Try-on Technologies for Online Retailing of Made-to-Measure Garments", 13 pgs.

Leu et al., "CAD model based virtual assembly simulation, planning and training", CIRP Annals—Manufacturing Technology, 62, 2013, pp. 799-822.

Pachoulakis et al., "Augmented Reality Platforms for Virtual Fitting Rooms", The International Journal of Multimedia & Its Application, vol. 4, No. 4, Aug. 2012, 12 pgs.

Park et al., Feasibility and user experience of virtual reality fashion stores, Fashion and Textiles, 2018, 17 pgs., https://doi.org/10.1186/s40691-018-0149-x.

Sequeira et al., "Automated reconstruction of 3D models from real environments", ISPRS Journal of Photogrammetry & Remote Sensing, 54, 1999, pp. 1-22.

Shopify AR powered by 3D Warehouse, Shopify help Center, 14 pgs., web address: https://help.shopify.com/en/manual/apps/apps-by-shopify/3d-warehouse.

Anonymous: "Clipping Paths", Retrieved from the internet: URL:https://helpx.adobe.com/indesign/using/clipping-paths.html, XP055973817, dated Jul. 23, 2021, pp. 1-8.

Kanazawa Angjoo et al. "Learning category—specific mesh reconstruction from image collections", IN: "Computer vision—ECCV 2018", Sringer, XP047635684, ISSN:0302-9743, dated Oct. 7, 2018, pp. 386-402.

Maker's Muse: "Bibliographic information for Trace Image to SVG into Fusion 360 using Inkspace (Free alternative to Illustrator)", Retrieved from the internet: URL: https://www.youtube.com/watch?v=CVgDbsglhyo, XP055973818, dated Jan. 24, 2019, 2 Pages.

All Office Actions; U.S. Appl. No. 17/825,067, filed on May 26, 2022.

U.S. Appl. No. 17/825,067, filed on May 26, 2022, to Diana Jobson Cheshire et al.

Diez Helen V. et al. "3D model management for e-commerce", Multimedia Tools and Applications, vol. 76, 2017, 21 Pages.

* cited by examiner

THREE-DIMENSIONAL (3D) MODELING SYSTEMS AND METHODS FOR AUTOMATICALLY GENERATING PHOTOREALISTIC, VIRTUAL 3D PACKAGE AND PRODUCT MODELS FROM 3D AND TWO-DIMENSIONAL (2D) IMAGING ASSETS

FIELD OF THE DISCLOSURE

The present disclosure generally relates to three-dimensional (3D) modeling systems and methods, and more particularly to, 3D modeling systems and methods for automatically generating photorealistic, virtual 3D package and product models from 3D and two-dimensional (2D) imaging assets.

BACKGROUND

In the consumer goods industry, physical product and packaging prototypes are generally required for the production or manufacture of corresponding real-world products or packages. Such prototypes are generally needed for consumer testing, management decisions, customer listing decisions, and as quality validation for manufacturing. Physical products and packaging prototypes provide companies, or otherwise company personnel responsible for authorizing the production of such prototypes, with confidence that the prototypes meet business and/or production objectives of new designs. In addition, sharing prototype design with consumers, such as consumer test groups, allows a company to validate investment in a new product or package design. Still further, these new designs are valuable, as a manufacturing company or wholesaler may show retailers, who may desire to list, or otherwise, stock, units or items using the new design. In addition, the new design may allow such retailers to use samples of the new design to aid in "planogramming" and verifying store shelving requirements.

A problem arises, however, in that production or design of physical prototypes is constrained by the time and investment typically required to create such physical prototypes. In particular, conventional methods for creating high quality physical prototypes during product development is slow, costly, and time consuming, and typically results in long development cycles or long iteration loops. This is because resource intensive tasks are employed to make the physical prototypes. Such task include assembling and developing separate hand carved models and/or computer printed parts, which may further require production, including drawing, spray painting, etc. These tasks are expensive and time consuming. Because of this, some companies and/or project teams may skip physical prototyping, which can lead to uncertainty in the development or success of product launches with retailers or end consumers.

For the foregoing reasons, there is a need for 3D modeling systems and methods for automatically generating photorealistic, virtual 3D package and product models from 3D and 2D imaging assets.

BRIEF SUMMARY

The 3D modeling systems and methods described herein provide for rapid creation or generation of high-quality, realistic virtual product and packaging prototypes. That is, implementation of the 3D modeling systems and methods described herein allow for such creation or generation in a fraction of the time compared with conventional, prior art prototyping techniques. In particular, highly accurate (e.g., in terms of weights, dimensions, physical appearance, etc.) virtual packages and products can be rendered quickly and for low cost. Such virtual packages and products can be used in the development process of a real-world product and packaging for a variety of purposes, including consumer testing, product modeling, management decision making, customer decision making, quality control, etc., all of which can reduce the development lifecycle dramatically. This results in speed to market improvements and ability to explore more designs, compared to prior art techniques, especially in the early creative phases of product development.

Generally, the 3D modeling systems and methods described herein provide a unique data-driven solution and an automated platform for automatically generating photorealistic, virtual 3D package and product models from 3D and 2D imaging assets. For example, in various embodiments, highly accurate virtual models of photorealistic, real-world packages and products may be generated and/or assembled from 3D and 2D imaging assets including any one or more of computer-aided design (CAD) files, artwork files, color files, material and finish libraries, dieline(s), and other relevant parametric files.

The 3D modeling systems and methods described herein may be applied to various categories of products and packages, e.g., including those in the consumer goods industry, for example, those requiring or otherwise having rigid packages. Such products and packages may include those in consumer products industry including hair care, grooming industry, laundry, toiletry, etc. and the like. For example, a highly accurate, photorealistic, virtual 3D model of a product and/or package (e.g., a shampoo bottle with a label or package of toilet paper with a wrapper) may be generated, assembled, and/or otherwise created from 3D and/or 2D imaging assets, including CAD files, dieline(s), and related parametric data, parametric label artwork files, pack configuration models or libraries (e.g. toilet paper roll configurations, pallet configurations, diaper stack dimensions, wrapper tightness models, wrapper folding models, carton folding models, in and outer wrapper color interference models, etc.), color, material and digital finish libraries and assembling. In various embodiments, such virtual 3D models can be further manipulated, e.g., in a visualization editor, and evaluated as needed for product and/or packing development. In addition, in some embodiments, such virtual 3D models can be imported into an immersive interactive virtual environment. In this way, the virtual 3D models can become part of a product and package data record for perpetual reuse in creating new and/or addition virtual 3D models for new, additional, or future products or packages.

The 3D modeling systems and methods described herein differs from the standard industry, or prior art, approach of creating 3D virtual models whereby a human modeler manually uses photographic images as a visual reference to infer shape, color, material, finish, etc. Such prior art methods lack the accuracy, repeatability and speed of the 3D modeling systems and methods described herein.

Accordingly, as described herein for some embodiments, a 3D modeling system configured to automatically generate photorealistic, virtual 3D package and product models from 3D and 2D imaging assets. The 3D modeling system may include one or more processors and an automatic imaging asset assembly script configured to execute on the one or more processors. In addition, the 3D modeling system may further include a memory configured to store 2D imaging assets and 3D imaging assets accessible by the automatic imaging asset assembly script. The one or more processors of the 3D modeling system may be configured to load, into a memory, one or more CAD components as selected from one or more of the 2D imaging assets or the 3D imaging assets. The one or more processors of the 3D modeling system may be configured to assemble, with the automatic imaging asset assembly script, the one or more CAD components to create a parametric-based CAD model. The parametric-based CAD model may correspond to a design for a real-world product or product package. The one or more processors of the 3D modeling system may be configured to generate a polygonal model of the real-world product or product package based on the parametric-based CAD model. One or more digital surface finish artifacts of a virtual material library, as selected from the 2D imaging assets, may be applied to the polygonal model. The one or more processors of the 3D modeling system may be configured to generate, based on parametric information of the parametric-based CAD model, a UV coordinate mapping corresponding to a virtual product label. The one or more processors of the 3D modeling system may be configured to generate a virtual 3D model of the real-world product or product package based on the polygonal model, the UV coordinate mapping, and the virtual product label. The one or more processors of the 3D modeling system may be configured to render, via a graphical display, the virtual 3D model as a photorealistic image representing the real-world product or product package.

In addition, as described in various embodiments herein, a 3D modeling method is disclosed for automatically generating photorealistic, virtual 3D package and product models from 3D and 2D imaging assets. The 3D modeling method includes loading, into a memory with one or more processors, one or more CAD components as selected from one or more of the 2D imaging assets or the 3D imaging assets. The 3D modeling method may further include assembling, with an automatic imaging asset assembly script implemented on the one or more processors, the one or more CAD components to create a parametric-based CAD model. The parametric-based CAD model may correspond to a design for a real-world product or product package. The 3D modeling method may further include generating, with the one or more processors, a polygonal model of the real-world product or product package based on the parametric-based CAD model. One or more digital surface finish artifacts of a virtual material library, as selected from the 2D imaging assets, may be applied to the polygonal model. The 3D modeling method may further include generating, with the one or more processors and based on parametric information of the parametric-based CAD model, a UV coordinate mapping corresponding to a virtual product label. The 3D modeling method may further include generating, with the one or more processors, a virtual 3D model of the real-world product or product package based on the polygonal model, the UV coordinate mapping, and the virtual product label. The 3D modeling method may further include rendering, via a graphical display, the virtual 3D model as a photorealistic image representing the real-world product or product package.

In addition, as described in various embodiments herein, a tangible, non-transitory computer-readable medium storing instructions is disclosed for automatically generating photorealistic, virtual 3D package and product models from 3D and 2D imaging assets. The instructions, when executed by one or more processors, cause the one or more processors to load, into a memory, one or more CAD components as selected from one or more of the 2D imaging assets or the 3D imaging assets. The instructions, when executed by one or more processors, may further cause the one or more processors to assemble the one or more CAD components to create a parametric-based CAD model. The parametric-based CAD model may correspond to a design for a real-world product or product package. The instructions, when executed by one or more processors, may further cause the one or more processors to generate a polygonal model of the real-world product or product package based on the parametric-based CAD model. One or more digital surface finish artifacts of a virtual material library, as selected from the 2D imaging assets, may be applied to the polygonal model. The instructions, when executed by one or more processors, may further cause the one or more processors to generate, based on parametric information of the parametric-based CAD model, a UV coordinate mapping corresponding to a virtual product label. The instructions, when executed by one or more processors, may further cause the one or more processors to generate a virtual 3D model of the real-world product or product package based on the polygonal model, the UV coordinate mapping, and the virtual product label. The instructions, when executed by one or more processors, may further cause the one or more processors to render, via a graphical display, the virtual 3D model as a photorealistic image representing the real-world product or product package.

In accordance with the above, and with the disclosure herein, the present disclosure includes improvements in computer functionality or in improvements to other technologies at least because, e.g., the disclosed 3D modeling systems and methods automatically generate photorealistic, virtual 3D package and product models from 3D and two-dimensional (2D) imaging assets. In this way, the 3D modeling systems and methods may flexibly, and efficiently, produce photorealistic image(s), as described herein, which improves the performance, speed, and efficiency of the underlying computing device(s), e.g., processors, memories, and/or servers, because such computing devices are freed from computational and memory extensive tasks regarding manually separately analyzing, compiling, and re-computing, disjoint, or non-assembled imaging assets (over a long period of time), which therefore avoids the reuse of memory and processor resources. That is, the present disclosure describes improvements in the functioning of the computer itself or "any other technology or technical field" because the computing devices upon which the 3D modeling systems and methods are implemented are enhanced by an automatic imaging asset assembly script and an efficient virtual 3D model generation algorithm that, together, increase the efficiency and speed of design of photorealistic images representing the real-world product or product package, and, ultimately real-world product or product packages themselves. This improves over the prior art at least because prior art systems were limited in that they do not provide such automated designs, and, therefore required increased memory and processing power, at least over time, to develop designs for real-world product or product packages. For example, the processor and memory resources used by the 3D modeling systems and methods are typically less than that of prior art systems for the same design over time. Not only do the disclosed 3D modeling systems and methods use fewer computational resources, they are much faster, and therefore more efficient, for generating virtual 3D models and/or photorealistic images representing real-world product(s) or product package(s).

In addition, with respect to certain embodiments, the present disclosure includes effecting a transformation or reduction of a particular article to a different state or thing, e.g., generating a virtual 3D model of a real-world product or product package, and, also, in some embodiments, initiating the creation of the real-world product or product package based on the virtual 3D model. For example, in some embodiments, the virtual 3D model may be used to create the real-world product or product package via a 3D printer and/or at a process plant configured to print or otherwise produce the real-world product or product package.

Similarly, with respect to certain embodiments, the present disclosure includes the application with, or by use of, a particular machine, e.g., use of a generated virtual 3D model to create real-world product(s) or product package(s) via a 3D printer and/or at a process plant configured to print or otherwise produce the real-world product(s) or product package(s).

Still further, the present disclosure includes specific limitations and features other than what is well-understood, routine, conventional activity in the field, or adding unconventional steps that confine the claim to a particular useful application, e.g., automatically generating photorealistic, virtual 3D package and product models from 3D and 2D imaging assets.

Additional advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

The Figures depict preferred embodiments for purposes of illustration only. Alternative embodiments of the systems and methods illustrated herein may be employed without departing from the principles of the invention described herein.

DETAILED DESCRIPTION

Figure 1:
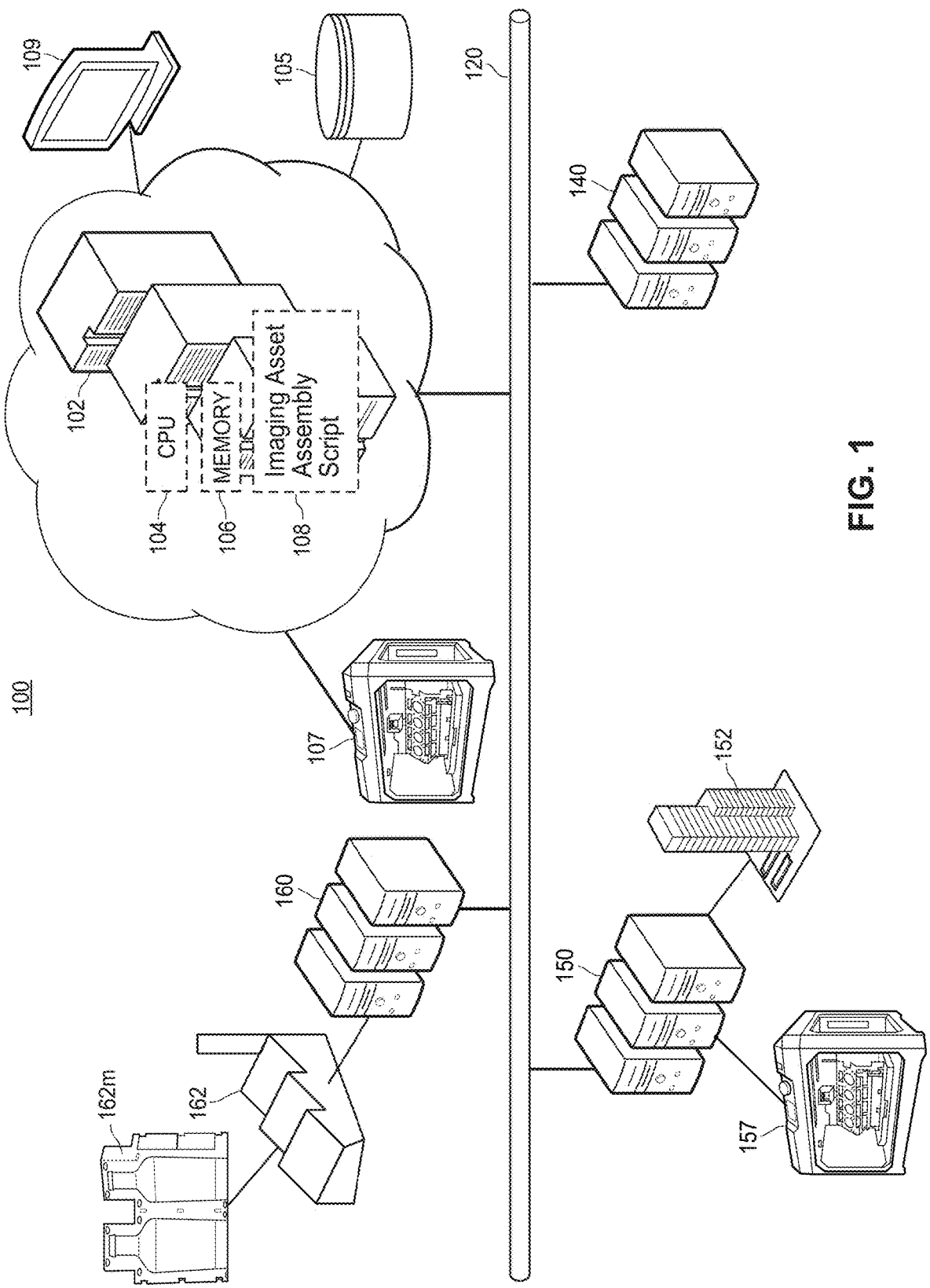
FIG. 1 illustrates an example 3D modeling system configured to automatically generate photorealistic, virtual 3D package and product models from 3D and 2D imaging assets, in accordance with various embodiments disclosed herein.

FIG. 1 illustrates an example three-dimensional (3D) modeling system 100 or platform configured to automatically generate photorealistic, virtual 3D package and product models from 3D and two-dimensional (2D) imaging assets, in accordance with various embodiments disclosed herein. In the example embodiment of FIG. 1, 3D modeling system 100 includes server(s) 102, which may be referred to herein as "modeling server(s)," and which may comprise one or more computer servers. In various embodiments, server(s) 102 comprise multiple servers, which may comprise multiple, redundant, or replicated servers as part of a server farm. In still further embodiments, server(s) 102 may be implemented as cloud-based servers. For example, server(s) 102 may be a cloud-based platform such as MICROSOFT AZURE, AMAZON AWS, GOOGLE CLOUD platform, or the like.

Server(s) 102 may include one or more processor(s) 104 as well as one or more computer memories 106. Memories 106 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Memorie(s) 106 may store an operating system (OS) (e.g., Microsoft Windows, Linux, Unix, etc.) capable of facilitating the functionalities, apps, methods, or other software as discussed herein. Memorie(s) 106 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the software, instructions, scripts, applications, software components, or APIs may include, otherwise be part of, an automatic imaging asset assembly script, machine learning component, and/or other such software, where each are configured to facilitate their various functionalities as described herein. It should be appreciated that one or more other applications or scripts, such as those described herein, may be envisioned and that are executed by processor(s) 104. In addition, while FIG. 1 shows implementation of the systems and methods on server(s) 102, it should be appreciated that the systems and methods herein may be implemented by a non-server computing system that includes one or more processors.

Processor(s) 104 may be connected to memories 106 via a computer bus responsible for transmitting electronic data, data packets, or otherwise electronic signals to and from processor(s) 104 and memories 106 in order to implement or perform the machine readable instructions, methods, processes, scripts, elements or limitations, as illustrated, depicted, or described for the various flowcharts, illustrations, diagrams, figures, and/or other disclosure herein.

Processor(s) 104 may interface with memory 106 via the computer bus to execute the operating system (OS). Processor(s) 104 may also interface with computer memory 106 via the computer bus to create, read, update, delete, or otherwise access or interact with the data stored in memory, including in memories 106 and/or the database 105 (e.g., a relational database, such as Oracle, DB2, MySQL, or a NoSQL based database, such as MongoDB). The data stored in memories 106 and/or the database 105 may include all or part of any of the scripts, data or information described herein, including, for example the automatic imaging asset assembly script, and/or the 2D imaging assets and 3D imaging assets as accessible by the automatic imaging asset assembly script.

As described herein a "memory" may refer to either memory 106 and/or database 105. Such memory may be configured to store 2D imaging assets and 3D imaging assets accessible by processor(s) 104, scripts, application, or other software, e.g., including an automatic imaging asset assembly script described herein.

In some embodiments, database 105 may be a product lifecycle management (PLM) database or system. Generally, a PLM database or system is implemented as an information management system that can integrate data, processes, and other business systems within an enterprise or platform, such as the platform depicted for 3D modeling system 100. A PLM database or system generally includes software for managing information (e.g., 3D imaging assets and 2D imaging assets) throughout an entire lifecycle of a product/package in an efficient and cost-effectivities manner. The lifecycle may include lifecycle stages from ideation, design and manufacture, through service and disposal. In some embodiments, database 105 may store digital PLM objects (e.g., digital 3D imaging assets and/or 2D imaging assets as described herein). Such digital objects or assets can represent a real-world physical parts, assemblies(s), or documents, customer requirements or supplier parts, a change process, and/or other data types relating to a lifecycle management and development of a product and/or package. For example, digital objects or assets can include computer-aided design (CAD) file(s) that depict or describe (e.g., via measurements, sizes, etc.) parts, components, or complete (or partially complete) models or designs of products and/or packages. Generally, non-CAD files can also be included database 105. Such non-CAD files can include text or data files describing or defining parts, components, and/or product or package specifications, vendor datasheets, or emails relating to a design. For example, a PLM database or system can index and access text contents of a file, which can include metadata or other information regarding a product or package for design purposes.

In addition, PLM objects or assets, and/or corresponding data records, such as those that may be stored in database 105, can contain properties regarding an object's or an asset's parameters or aspects of its design lifecycle. For example, PLM database or systems can generally store different classes of objects or assets (primarily parts (e.g., as CAD files), documents, and change forms) with distinct properties and behaviors. Such properties can include metrics or metadata such as part/document number, item category, revision, title, unit of measure, bill of materials, cost, mass, regulatory compliance details, file attachments, and other such information regarding product(s), and/or package(s) of a company. In addition, such PLM objects or assets may be linked, e.g., within database 105 (e.g., as a relational database), to other objects or assets within database 105 for the association of or otherwise generation or construction of a product structure. In this way, a PLM database can be flexibly used to identify objects and assets, create and define relationships among such objects and assets. Such flexibility provides a basis for the creation, customization, revision, and/or reuse of virtual models (e.g., virtual 3D models) as described herein, and also the 3D and 2D imaging assets on which they are based.

For example, in some embodiments, processor(s) 104 may store virtual 3D model(s) in memory 106 and/or database 105 such that virtual 3D model(s) are accessible to an automatic imaging asset assembly script or a visualization editor. In this way, an automatic imaging asset assembly script or the visualization editor, in a new or next iteration of a product lifecycle or introduction of new product lifecycle, may generate one or more new or additional virtual 3D models corresponding to one or more new or additional real-world products or product packages.

In various embodiments described herein, database 105, implemented as a PLM database or system, can support CAD files for components or parts of existing or future (i.e., to be designed) products and/or packages. Such a PLM database or system can be implemented, for example, via third party software such as ALTIUM DESIGNER, ORCAD component information system (CIS), or the like While a PLM based database and system are described in various embodiments herein, it is to be understood that other database or memory management systems (e.g., standard relational databases, NoSQL databases, etc.) may likewise be used in accordance with the disclosure of the 3D modeling systems and methods herein. As a non-limiting example, a PLM based database and/or system may comprise a "data lake" or the like, where a data lake or similar such database can comprise a system or repository of data stored in its natural/raw format, for example, as object blobs, raw bytes, and/or data files.

Further with respect to FIG. 1, server(s) 102 may further include a communication component configured to communicate (e.g., send and receive) data via one or more external/network port(s) to one or more networks or local terminals, such as computer network 120 and/or terminal 109 (for rendering or visualizing) as described herein. In some embodiments, server(s) 102 may include a client-server platform technology such as ASP.NET, Java J2EE, Ruby on Rails, Node.js, Flask, or other web service or online API, responsive for receiving and responding to electronic requests. The server(s) 102 may implement the client-server platform technology that may interact, via the computer bus, with memories(s) 106 (including the applications(s), component(s), API(s), data, etc. stored therein) and/or database 105 to implement or perform the machine readable instructions, methods, processes, elements or limitations, as illustrated, depicted, or described for the various flowcharts, illustrations, diagrams, figures, and/or other disclosure herein. According to some embodiments, the server(s) 102 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 120.

Server(s) 102, via processor(s) 104, may further include, implement, or launch a visualization editor, or otherwise operator interface, to render models or photorealistic images, present information to a user, and/or receive inputs or selections from the user. As shown in FIG. 1, the user interface may provide a display screen or graphic display (e.g., via terminal 109).

Server(s) 102 may also provide I/O components (e.g., ports, capacitive or resistive touch sensitive input panels, keys, buttons, lights, LEDs), which may be directly accessible via or attached to server(s) 102 or may be indirectly accessible via or attached to terminal 109. According to some embodiments, a user may access the server 102 via terminal 109 to render models or photorealistic images (e.g., via a visualization editor), review information, make changes, input data, and/or perform other functions.

As described above herein, in some embodiments, server(s) 102 may perform the functionalities as discussed herein as part of a "cloud" network or may otherwise communicate with other hardware or software components within the cloud to send, retrieve, or otherwise analyze data or information (e.g., virtual 3D model(s)) as described herein.

In various embodiments herein, a computer program, script, code, or application, (e.g., an automatic imaging asset assembly script) may comprise computer-readable program code or computer instructions, in accordance with embodiments herein, and may be stored on a computer usable storage medium, or tangible, non-transitory computer-readable medium (e.g., standard random access memory (RAM), an optical disc, a universal serial bus (USB) drive, or the like). Such comprise computer-readable program code or computer instructions may be installed on or otherwise adapted to be executed by processor(s) 104 (e.g., working in connection with the respective operating system in memories 106) to facilitate, implement, or perform the machine readable instructions, methods, processes, elements or limitations, as illustrated, depicted, or described for the various flowcharts, illustrations, diagrams, figures, and/or other disclosure herein. In this regard, the program code or scripts may be implemented in any desired program language, and may be implemented as machine code, assembly code, byte code, and/or interpretable source code or the like (e.g., via Golang, Python, C, C++, C#, Objective-C, Java, Scala, ActionScript, JavaScript, HTML, CSS, XML, etc.). For example, as described herein, server(s) 102, implementing processor(s) 104, may execute one or more automatic imaging asset assembly scripts to assemble or otherwise manipulate or generate parametric-based CAD models or other models described herein.

In the example embodiment of FIG. 1, modeling server(s) 102 are communicatively connected, via computer network 120. Computer network 120 may comprise a packet based network operable to transmit computer data packets among the various devices and servers described herein. For example, computer network 120 may consist of any one or more of Ethernet based network, a private network, a local area network (LAN), and/or a wide area network (WAN), such as the Internet.

For example, as shown for FIG. 1, computer network 120 connects and extends 3D modeling system 100, where virtual 3D model(s) may be transmitted to third-party server(s) 150 of third-parties (e.g., such as retailers or customers) at remote locations 152 for creation or review of real-world product(s) and/or product packages as described herein. In such embodiments, server(s) 102 and/or processor(s) 104 may be configured to initiate creation of at least a portion of a real-world product or product package based on a virtual 3D model, as described herein. For example, in some embodiments, a virtual 3D model may be transmitted to a 3D printer for creation of at least a portion of the real-world product or product package. For example, either local 3D printer 107 or remote 3D printer 157 (e.g., via computer network 120) may receive a virtual 3D model for printing of a corresponding real-world product and/or product package (or portion thereof). In such embodiments, a 3D printer may load, or otherwise analyze, a virtual 3D model as described herein, causing the 3D printer to print or produce the corresponding real-world product or product package (or portion thereof).

Still further, computer network 120 may connect and extend 3D modeling system 100, where virtual 3D model(s) may be transmitted to factory server(s) 160 of a factory or process plant 162 for creation or review of real-world product(s) and/or product packages. In such embodiments, server(s) 102 may transmit, via computer network 120, a virtual 3D model to factory or process plant 162 for creation, processing, production, and/or manufacture of at least a portion of a real-world product or product package. In some embodiments, receipt of the virtual 3D model may queue a real-world product or product package (or portion thereof) for production or creation by the factory or process plant 162. For example, the virtual 3D model may be used to generate a mold or part (e.g., mold 162*m*). The mold (e.g., mold 162*m*) may then be used to manufacture or make, e.g., at the process plant (e.g., process plant 162) a physical item (e.g., a rigid and/or plastic bottle) and/or portions or parts thereof. Additionally, or alternatively, the mold may be created a remote location to the process plant (e.g., at a designers location) and then physically transferred (e.g., shipped) to the process plant for manufacture or make of the physical item (e.g., a rigid and/or plastic bottle) and/or portions or parts thereof.

In some embodiments, modeling server(s) 102 may be downloaded or retrieved 2D imaging assets and/or 3D imaging assets over computer network 120. For example, 2D imaging assets and/or 3D imaging assets may be downloaded, by modeling server(s) 102, from remote server(s) 140 which may store 2D imaging assets and/or 3D imaging assets. Remote server(s) 140 may be those of a third-party or of the company designing or developing product(s) and/or product package(s) as described herein. In some embodiments, a portion or subset of 2D imaging assets or 3D imaging assets required to design product(s) and/or product package(s) may be retrieved from the remote server(s) 140.

Figure 2:
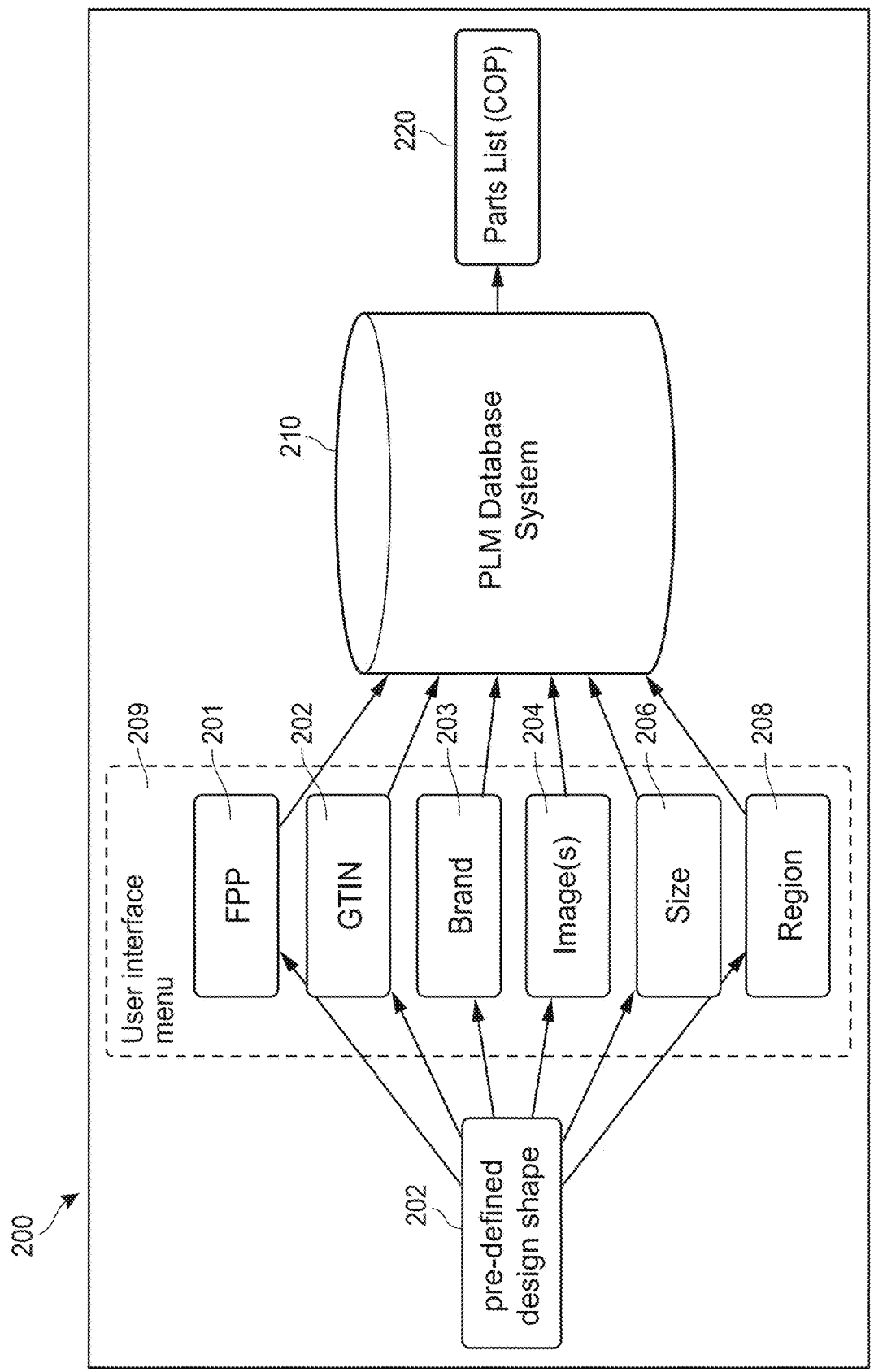
FIG. 2 illustrates a flow diagram depicting a memory configured to store the 2D imaging asset(s) and the 3D imaging asset(s), or links or references to such assets, as described for the 3D modeling system of FIG. 1, and in accordance with various embodiments disclosed herein.

FIG. 2 illustrates a flow diagram 200 depicting a memory (e.g., PLM database system 210) configured to store the 2D imaging asset(s) and the 3D imaging asset(s) (e.g., assets 201-208), or links or references to such assets, as described for the 3D modeling system of FIG. 1, in accordance with various embodiments disclosed herein. In the embodiment of FIG. 2, PLM database system 210 corresponds to database 105 and/or memory 106, and related disclosure, as described for FIG. 1.

In the embodiment of FIG. 2, a predefined design shape corresponding to a real-world product or product package (e.g., a shampoo bottle with a label or package of toilet paper with a wrapper) is selected for submission and search of PLM database system 210. As shown in the embodiment of FIG. 2, a user may select the predefined design shape from a user interface 209. In other embodiments, one or more predefined design shape(s) may be loaded into a script for submission to the PLM database system 210 without user selection. Various types of shapes may be selected or used as the predefined design shape 3D. This includes shapes corresponding to products and/or packages of, or corresponding to, bottles, cartons, canisters, wrappers, boxes, bags, and the like.

With respect to the embodiment of FIG. 2, the predefined design shape is associated with various 2D imaging asset(s), the 3D imaging asset(s), and/or information, including links or references, to such assets, which are stored in and accessible via PLM database system 210. Selection or submission of the predefined design shape causes a search of PLM database system 210 to identify the corresponding 2D imaging asset(s), the 3D imaging asset(s), and/or information, including links or references, to such assets. The search returns a parts list 220, which may contain new or additional 2D imaging asset(s), the 3D imaging asset(s), and/or information relating to parts, components, products, or packages that match or otherwise correspond to, within a given threshold, the predefined design shape.

As shown in the embodiment of FIG. 2, PLM database system 210 can store, and can be searched or queried for, imaging asset(s) including 3D imaging asset(s), FFP information 201, global trade item numbers (GTIN) identifiers 202 for identifying part and component information (e.g., CAD files for parts or components of products and/or packages), brands 203 associated with products and/or packages related to the GTIN values, image(s) 204 of products and/or packages corresponding to the GTIN values and/or packages, size information 206 of products and/or packages corresponding to the GTIN values and/or packages, and region 208 where such products and/or packages are typically sold.

Figure 3A:
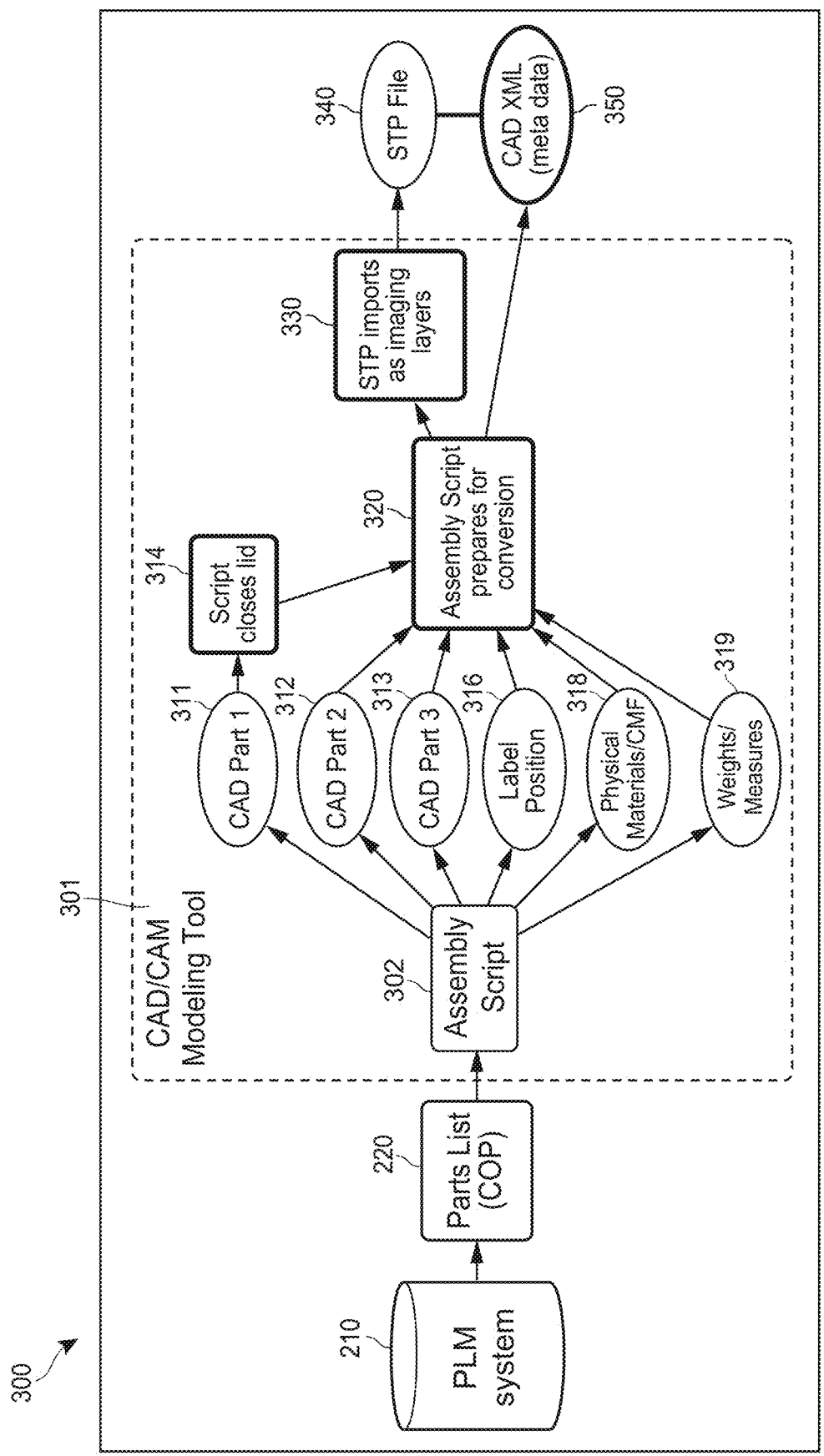
FIG. 3A illustrates a flow diagram of an example automatic imaging asset assembly script for assembling the 2D imaging asset(s) and/or the 3D imaging asset(s) of FIGS. 1 and 2, in accordance with various embodiments disclosed herein.

FIG. 3A illustrates a flow diagram 300 of an example automatic imaging asset assembly script 302 for assembling the 2D imaging asset(s) and/or the 3D imaging asset(s) as described for FIGS. 1 and 2, in accordance with various embodiments disclosed herein. As used to herein, in some embodiments, CAD components may be 3D imaging assets, such as STP (Standard for the Exchange of Product) files, which may be rotated and/or viewed from various different angles within 3D space as rendered in a visualization editor. Additionally, or alternatively, CAD components may be 2D imaging assets, such as DWF (Design Web Format), DWG (Drawing) files, or DXF (Drawing exchange format), which may show one or more views, angles, or perspectives in a visualization editor rendered in 2D space. It is to be understood that additional and/or other file types, formats, or extensions may be used or accessed by automatic imaging asset assembly scripts as described herein.

In the embodiment of FIG. 3A, automatic imaging asset assembly script 302 may access (or be provided) parts list 220, as described for FIG. 2, from PLM database system 210. Automatic imaging asset assembly script 302 may then assemble parts or components by analyzing the GTIN identifiers 202 in parts list 220. For example, GTIN identifiers 202 may be used to look up product and/or package information in a database (e.g., database 105 and/or memory 106). Such information may include CAD components (e.g., a CAD part 311, a CAD part 312, and a CAD part 313) or other information (e.g., label position 316, physical and/or color-material-finishes (CMF) data or libraries (e.g., including chromatic/color, tactile and decorative identity of a design of a product/package), referred to herein as physical materials/CMF 318, weights/measurements 319, or other information as described herein, of products and/or packages, or parts thereof) that will be used to construct virtual 3D models, or other models or assets, as described herein. Physical materials/CMF 318 may also include meta data such as formula(s) and/or ingredients corresponding to physical characteristics of, or the making and/or manufacturing of, products and/or packages, or parts thereof as described herein. In some embodiments, automatic imaging asset assembly script 302 may be implemented or executed by a CAD or computer-aided manufacturing (CAM) platform or software modeling tool 301, such as the CATIA software modeling tool as provided by Dassault Systèmes, or the like.

Figure 3B:
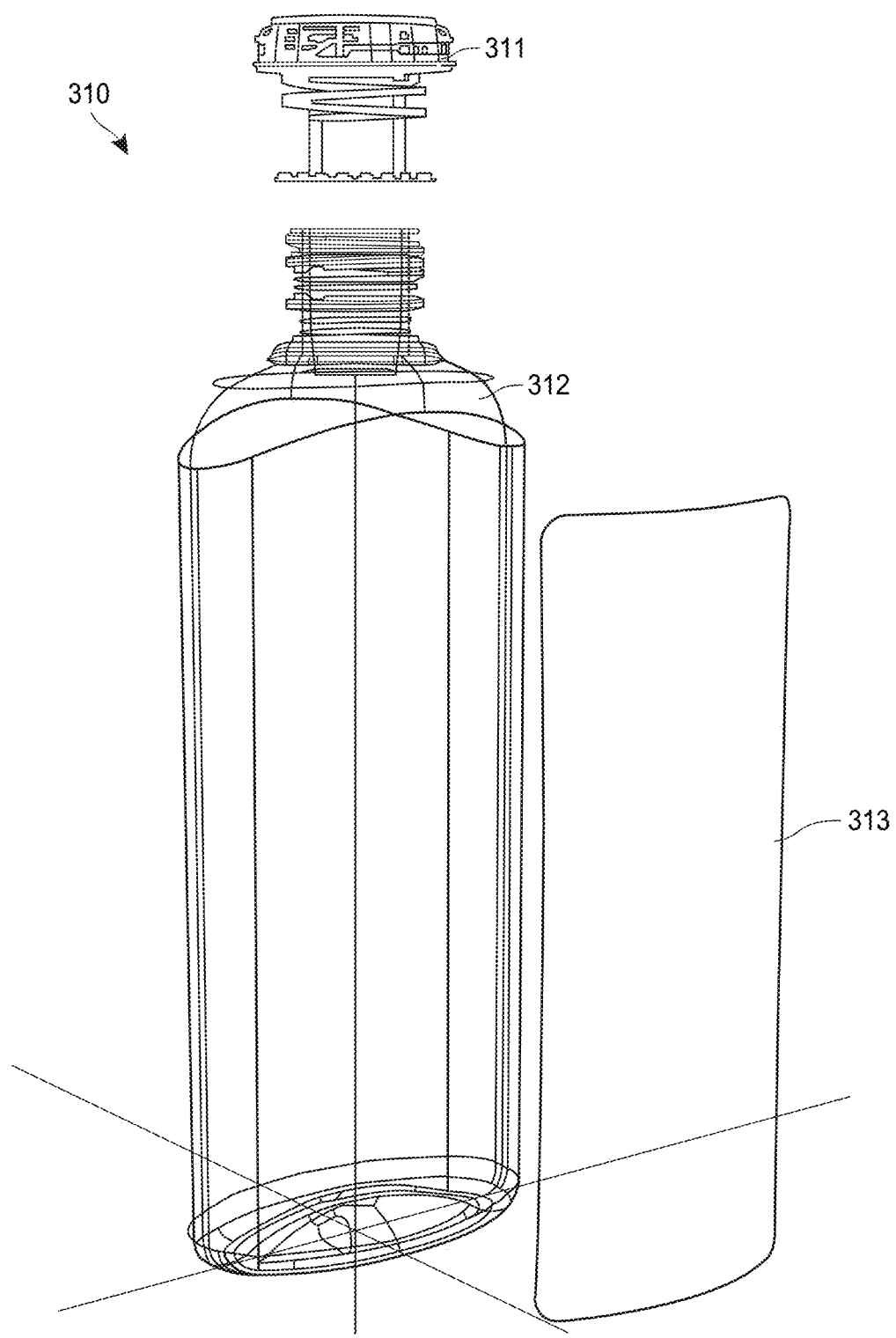
FIG. 3B illustrates a visualization or rendering of CAD components as selected from the 2D imaging asset(s) and/or the 3D imaging asset(s) as described for FIG. 3A, and in accordance with various embodiments disclosed herein.
Figure 3C:
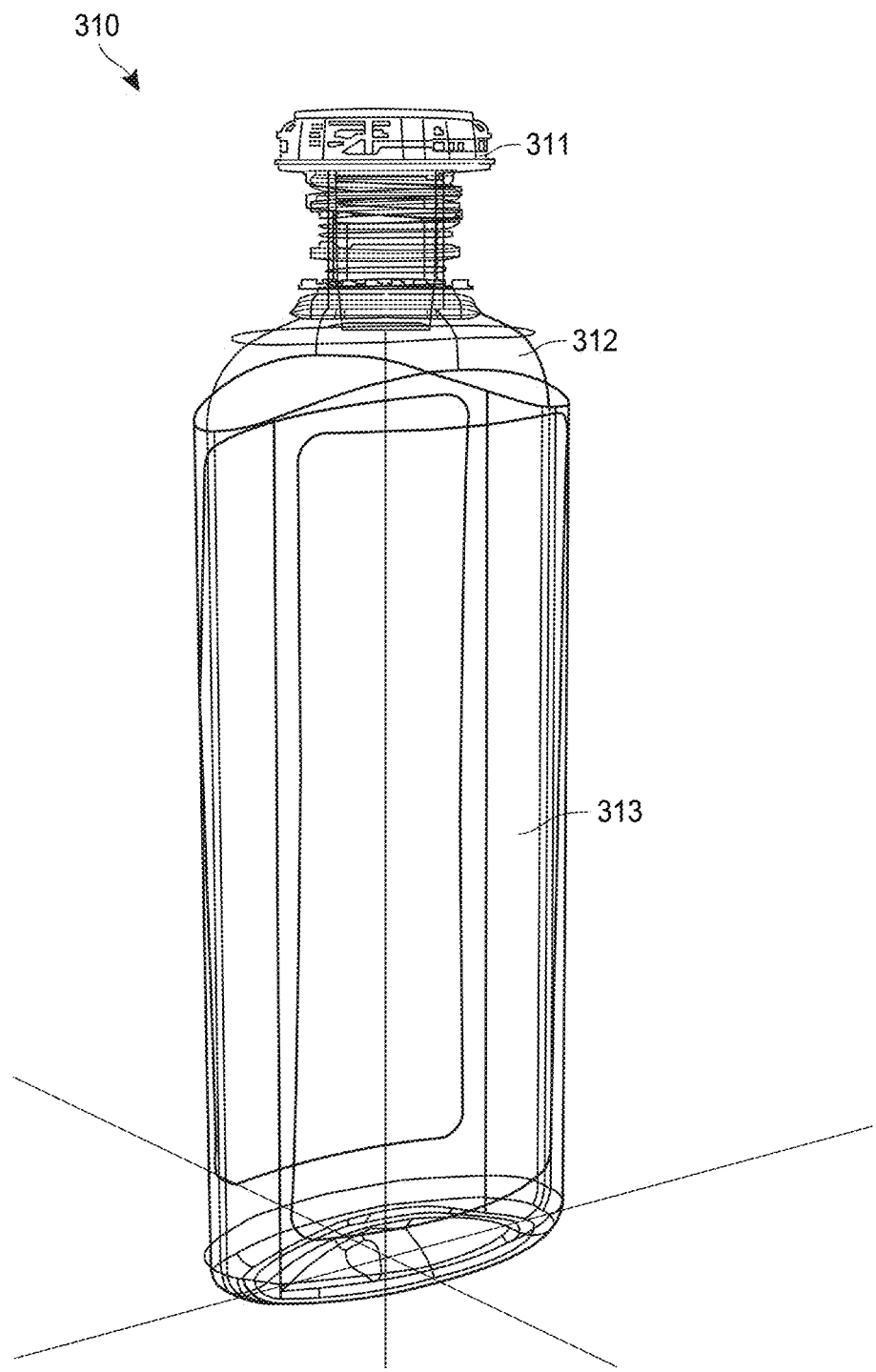
FIG. 3C illustrates a visualization or rendering of a parametric-based CAD model as created from the CAD components of FIG. 3B, in accordance with various embodiments disclosed herein.

In the embodiment of FIG. 3A, processor(s) 104 are configured to load, into a memory (e.g., memory 106 and/or database 105), one or more CAD components (e.g., a CAD part 311, a CAD part 312, and a CAD part 313) as selected from one or more of the 2D imaging assets or the 3D imaging assets. In this way, the one or more CAD components (e.g., CAD parts 311-313) are loaded in memory based on the predefined design shape corresponding to the real-world product or product package as described for FIG. 2. In some embodiments, an activation, identification, or otherwise selection of the predefined design shape may cause processor(s) 104 to select and execute automatic imaging asset assembly script 302. Additionally, or alternatively, automatic imaging asset assembly script 302 may be selected based on a classification of the predefined design shape as identified or otherwise selected. For example, database 105 and/or memory 106 may store a plurality of automatic imaging asset assembly scripts (e.g., 100s or 1000s of scripts) corresponding to various different shapes or product and/or packaging types, such as any of those as described herein. Each of these automatic imaging asset assembly scripts are configured to assemble specific 3D and/or 2D imaging assets for the development of virtual 3D models as described herein. For example, FIGS. 3A-3C illustrate an embodiment of an automatic imaging asset assembly script (e.g., automatic imaging asset assembly script 302) for assembling a virtual 3D model of a shampoo bottle with a label. In some embodiments, the automatic imaging asset assembly scripts may be accessed or looked-up in a lookup table (e.g., a digital dictionary or relational table) based on the classification (e.g., bottle type shape) of the predefined design shape (e.g., where the predefined design shape is used as a "key" or index for the lookup).

Additionally, or alternatively, a machine learning or artificial intelligence algorithm may be used to detect automatic imaging asset assembly script to execute or use. In such embodiments, for example, parts list 220 may be used as feature data that may be input in a script detection AI model. The script detection AI model may be previously trained on parts list information (e.g., assets 201-208). When the parts list 220 is input, the script detection AI model may classify the parts list 220 as a bottle type shape. The script detection AI model may then return a list of automatic imaging asset assembly scripts that correlate to bottle type shapes. A script (e.g., automatic imaging asset assembly script 302) with the highest probability of matching the given parts list 220 is then be selected by processor(s) 104 for assembling CAD components, etc., as described herein.

With respect to FIG. 3A, processor(s) 104 of 3D modeling system 100 may be configured to assemble, with automatic imaging asset assembly script 302, the one or more CAD components (e.g., CAD parts 311 to 313) to create a parametric-based CAD model. The parametric-based CAD model may be corresponding to a design for a real-world product or product package (e.g., a shampoo bottle with a label).

For example, FIG. 3B illustrates a visualization or rendering of CAD components (CAD parts 311 to 313) as selected from 2D or 3D imaging asset(s) as described for FIG. 3A, and in accordance with various embodiments disclosed herein. In the embodiment of FIG. 3B, each of CAD parts 311 to 313 is depicted separately such that a parametric-based CAD model 310 (as described for FIG. 3C herein) is shown in an exploded view. As shown, CAD part 311 is a cap of a shampoo bottle; CAD part 312 is a body of the shampoo bottle; and CAD part 313 is a label of the shampoo bottle. Each of these components is shown as rendered as a virtual or 3D component. In addition, in various embodiments, each of these components, includes parametric information. Parametric information may include information regarding curves, equations, and relational data defining the shape of each of the components, i.e., CAD parts 311 to 313. In various embodiments, herein, such parametric information, or variables related to each of the components, can be manipulated or edited, e.g., by processor(s) 104, to alter, update, or otherwise modify or change the shape, appearance, volume, or otherwise dimensions or more of the components (e.g., CAD parts 311 to 313), in order to make the parts fit together or otherwise form a complete or wholly formed virtual product and/or product package.

For example, FIG. 3C illustrates a visualization or rendering of a parametric-based CAD model 310 as created from the CAD components (CAD parts 311 to 313) of FIG. 3B, in accordance with various embodiments disclosed herein. Parametric-based CAD model 310 comprises each of the CAD parts 311 to 313 (from FIG. 3B), but is a complete or wholly formed virtual product and/or product package (e.g., of a shampoo bottle). As illustrated by FIG. 3A, automatic imaging asset assembly script 302 assembles CAD parts 311 to 313, e.g., by closing (314) the lid/cap (CAD part 311) and orients the label (CAD part 313) to the body (CAD part 312) to form the virtual shampoo bottle (i.e., the parametric-based CAD model 310). The closing and attaching are performed in 3D space based on the parametric information and relation of such data among each of the CAD components (CAD parts 311 to 313). In this way, automatic imaging asset assembly script 302 assembles the appropriate CAD components, corresponding with the predefined design shape, by performing automatic imaging mapping, positioning, or otherwise correlation by closing the cap/lid, fixing orientation of the various CAD components with respect to one another, which includes, assembling the bottle, cap, and label. This may include by using die-line(s) on surface(s) of the components.

Automatic imaging asset assembly script 302 also assembles (320) each of the other 2D or 3D imaging assets, including the label position 316, physical materials/CMF 318, and/or weights/measurements 319 to prepare the parametric-based CAD model 310 for conversion, or allow the generation, of polygonal models as described herein.

As shown by FIG. 3A, parametric-based CAD model 310, together with its CAD components (CAD parts 311 to 313), may be exported to an STP file 340 (or other 3D asset file). In various embodiments, STP file 340 includes importing or saving (e.g., into STP file 340 or, more generally, into memory 106 or database 105) purpose formatted layers, referred to herein as imaging layers 330, for automation later in the process. The imaging layers 330 may define sections (such as separations) of the CAD parts 311 to 313 for manipulation parts or components. In some embodiments, imaging layers 330 are used to map a virtual label (e.g., CAD part 313) to a polygonal model of a real-world product and/or package, for example, as described herein for FIGS. 6A and 6B.

In addition, parametric data and/or meta-data, which may include physical and/or color-material-finishes (CMF) data or libraries (e.g., including chromatic/color, tactile and decorative identity of a design of a product/package), weights, measures, or configurations corresponding to parametric-based CAD model 310 (which may correspond to physical materials/CMF 318 and/or weights/measurements 319), may be stored in a meta-data file to be used with conversion of the parametric-based CAD model 310, or allow the generation, of polygonal models as described herein. The meta-data file may be an extensible markup language (XML) file, e.g., CAD XML file 350.

In various embodiments, STP file 340 and/or CAD XML file 350 may be stored and correlated or referenced together in a database (e.g., database 105). The STP file 340 and/or CAD XML may be identified with a GTIN identifier so as to be recalled or reused to create the shampoo bottle depicted by parametric-based CAD model 310 or for future use to create new or different versions of bottle based products and/or packages in future projects or iterations.

Figure 4A:
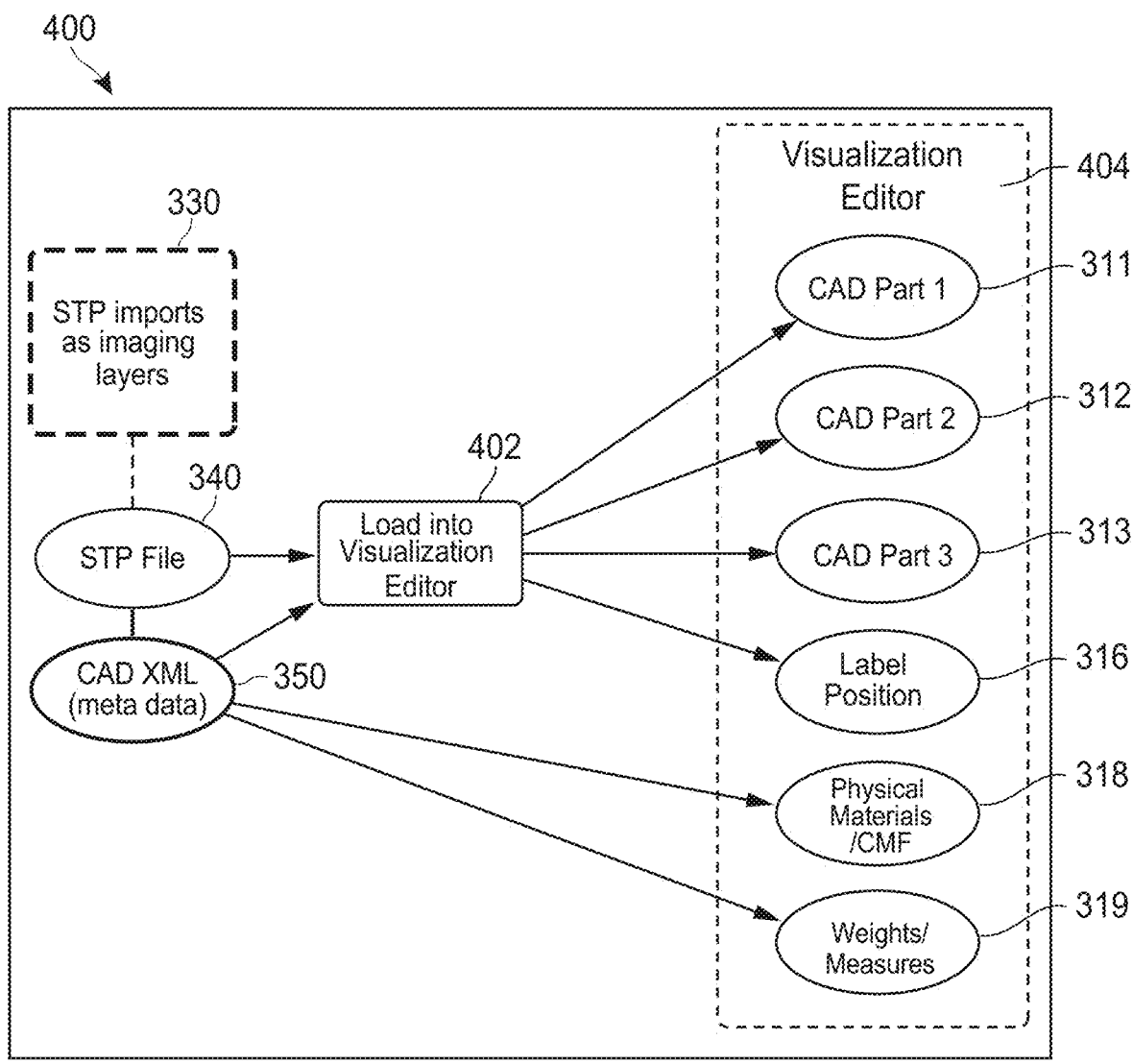
FIG. 4A illustrates a flow diagram for generating a polygonal model of a real-world product or product package based on the parametric-based CAD model of FIG. 3C, in accordance with various embodiments disclosed herein.

FIG. 4A illustrates a flow diagram 400 for generating a polygonal model 410 of a real-world product or product package based on parametric-based CAD model 310 of FIG. 3C, in accordance with various embodiments disclosed herein. Generally, a polygonal model is a 3D graphic or virtual model that represents or approximates surfaces of real world objects using polygon meshes (e.g., a series connected planar shapes, e.g., triangles or quads, defined in 3D space). Polygonal models may be rendered via, e.g., physically based ray-tracer rendering. Additionally, or alternatively, the polygon models, as described herein, may be generated via various 3D imaging techniques, including via non-uniform rational basis spline (NURBS) surfaces, sub-division surfaces, and equation-based surface representations as used in ray traced graphics.

In some embodiments, flow diagram 400 is implemented as a fully automated algorithm or script executed or implemented by processor(s) 104. Additionally, or alternatively, flow diagram 400 may be implemented or augmented by a visualization editor, or its underlying software, packages, and/or APIs, including through software or scripts provided by the visualization editor and/or through interaction by a user of the visualization editor. For example, in the embodiment of FIG. 4A, the 2D imaging assets and 3D imaging assets as described for FIGS. 3A-3C (e.g., assets 311 to 319) may be loaded (402) into a visualization editor. Visualization editors, software, packages, and/or APIs that may be used with flow diagram 600 include those software packages, tools, and/or visualization editors as executable by MODO and COLORWAY as provided by Foundry Visionmongers Ltd., MAYA as provided by Autodesk, Inc., CINEMA 4D as provided by MAXON computer GmbH, or the like.

Once loaded into the visualization editor, the 2D and/or 3D imaging assets may be used by the visualization editor to generate a polygonal model. For example, a polygonal generation script (e.g., polygonal model generation script 502, as described for FIG. 5A) may invoke the visualization editor, and/or its 3D software, to manipulate, orient, or otherwise check the 2D and/or 3D imaging assets for quality and accuracy. For example, the polygonal orientation script may check each of CAD parts 311 to 313 for accurate sizing and/or positioning with respect to one another so that each of CAD parts 311 to 313 form a complete or whole (and accurately scaled) version of a real-world product or product package (e.g., the shampoo bottle as described for FIGS. 3A-3C).

Figure 4B:
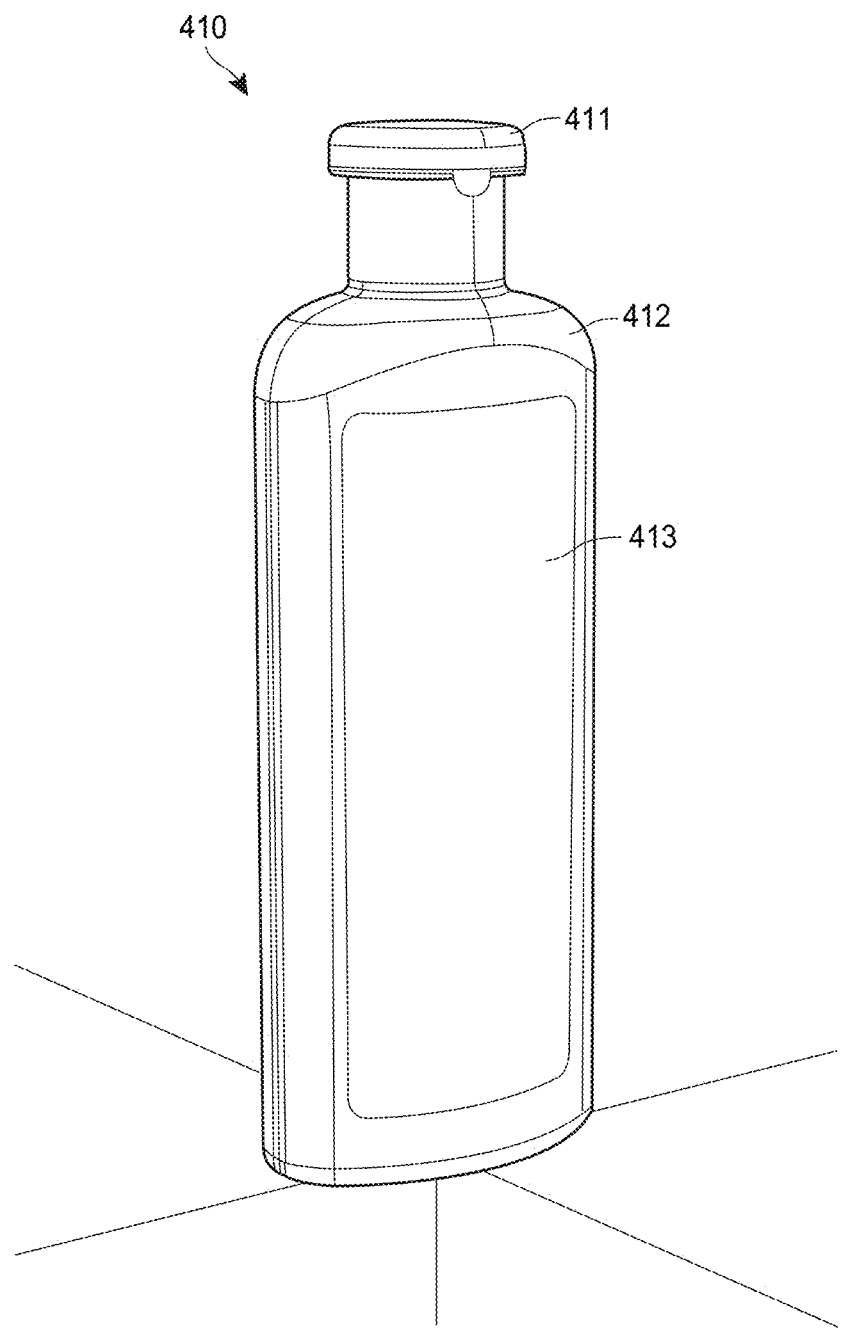
FIG. 4B illustrates a visualization or rendering of the polygonal model of the real-world product or product package of FIG. 4A, in accordance with various embodiments disclosed herein.

FIG. 4B illustrates a visualization or rendering of the polygonal model 410 of the real-world product or product package of FIG. 4A, in accordance with various embodiments disclosed herein. In the embodiment of FIG. 4B, each of CAD parts 311 to 313 is depicted oriented and aligned such polygonal model 410 is shown as a complete or whole (and accurately scaled) version of a real-world product or product package (e.g., the shampoo bottle as described for FIGS. 3A-3C). Similar to parametric-based CAD model 310, from which polygonal model 410 was generated, polygonal model 410 includes or represents CAD part 311 as a cap of a shampoo bottle; CAD part 312 as a body of the shampoo bottle; and CAD part 313 as a label of the shampoo bottle. Each of these components is shown as a virtual or 3D component that is part of the polygonal model 410.

In some embodiments, a visualization editor (e.g., MODO) may be launched or otherwise executed with processor(s) 104, where the visualization editor is configured to load, on a graphical display (e.g., terminal 109), any one or more of the one or more CAD components (e.g., CAD parts 311 to 313), parametric information associated with polygonal model 410, the parametric-based CAD model 410 itself, a polygonal model (e.g., a polygonal model 410), or other visualizable or renderable images or assets, including a UV coordinate mapping, a virtual product label, or a virtual 3D model, as described herein. Each of these imaging assets or models may be manipulated or changed in the visualization editor and applied the polygonal model 410 to create new, different, or updated designs or changes. Such changes may include, by way of non-limiting example, changes or manipulations to scale, size, color, texture, position, orientation, etc.

Figure 5A:
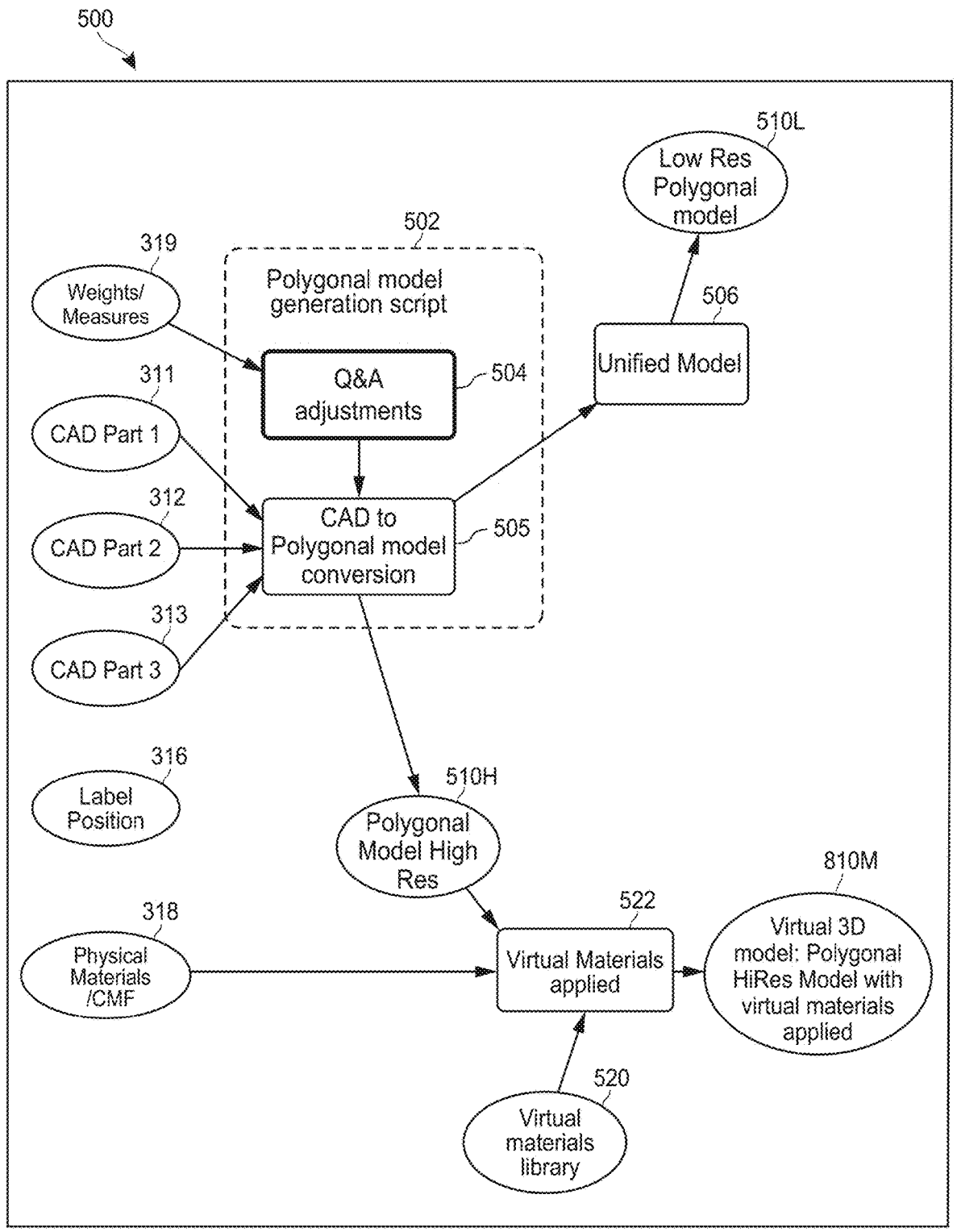
FIG. 5A illustrates a flow diagram for generating high and low resolution polygonal models of real-world products or product packages, in accordance with various embodiments disclosed herein.
Figure 5B:
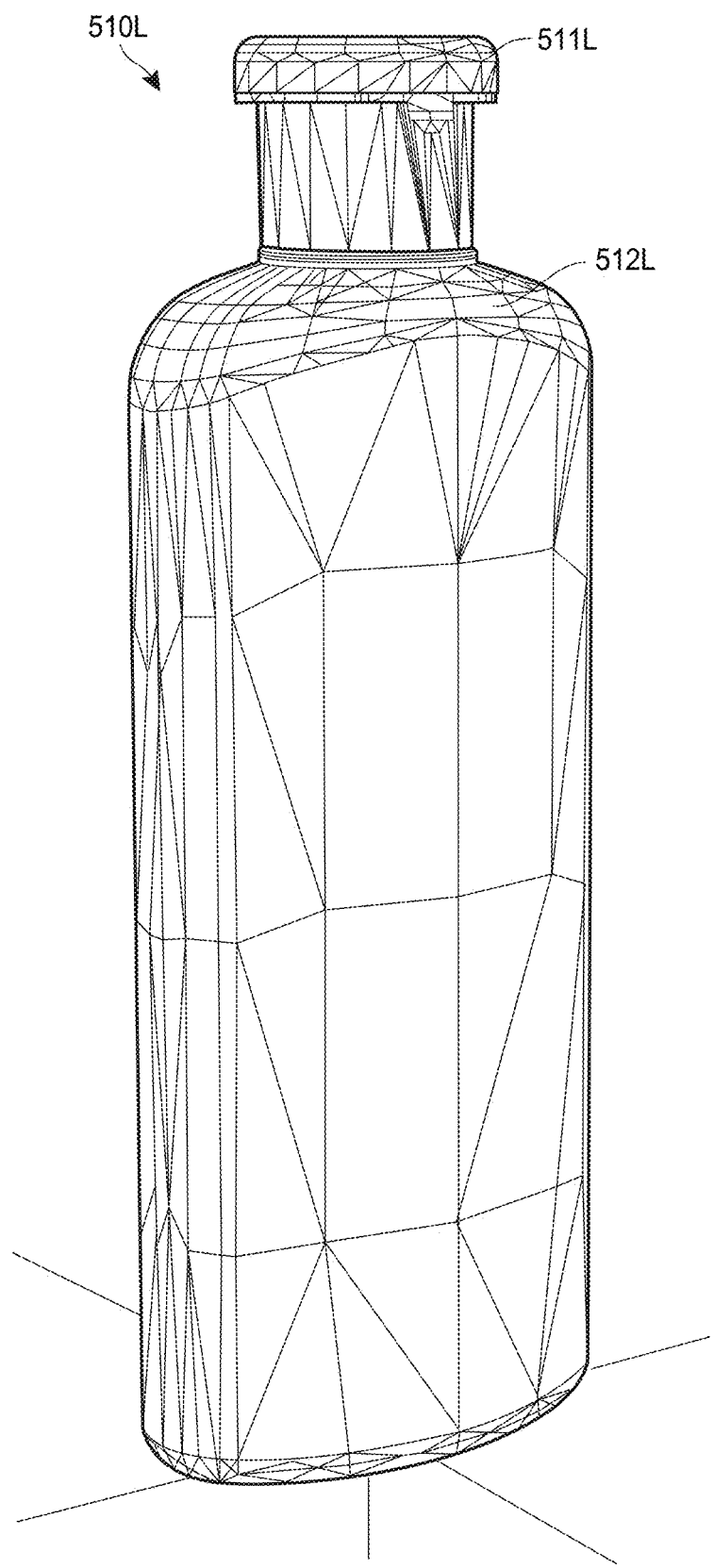
FIG. 5B illustrates a visualization or rendering of a low resolution polygonal model of a real-world product or product package created in accordance with flow diagram of FIG. 5A, and in accordance with various embodiments disclosed herein.
Figure 5C:
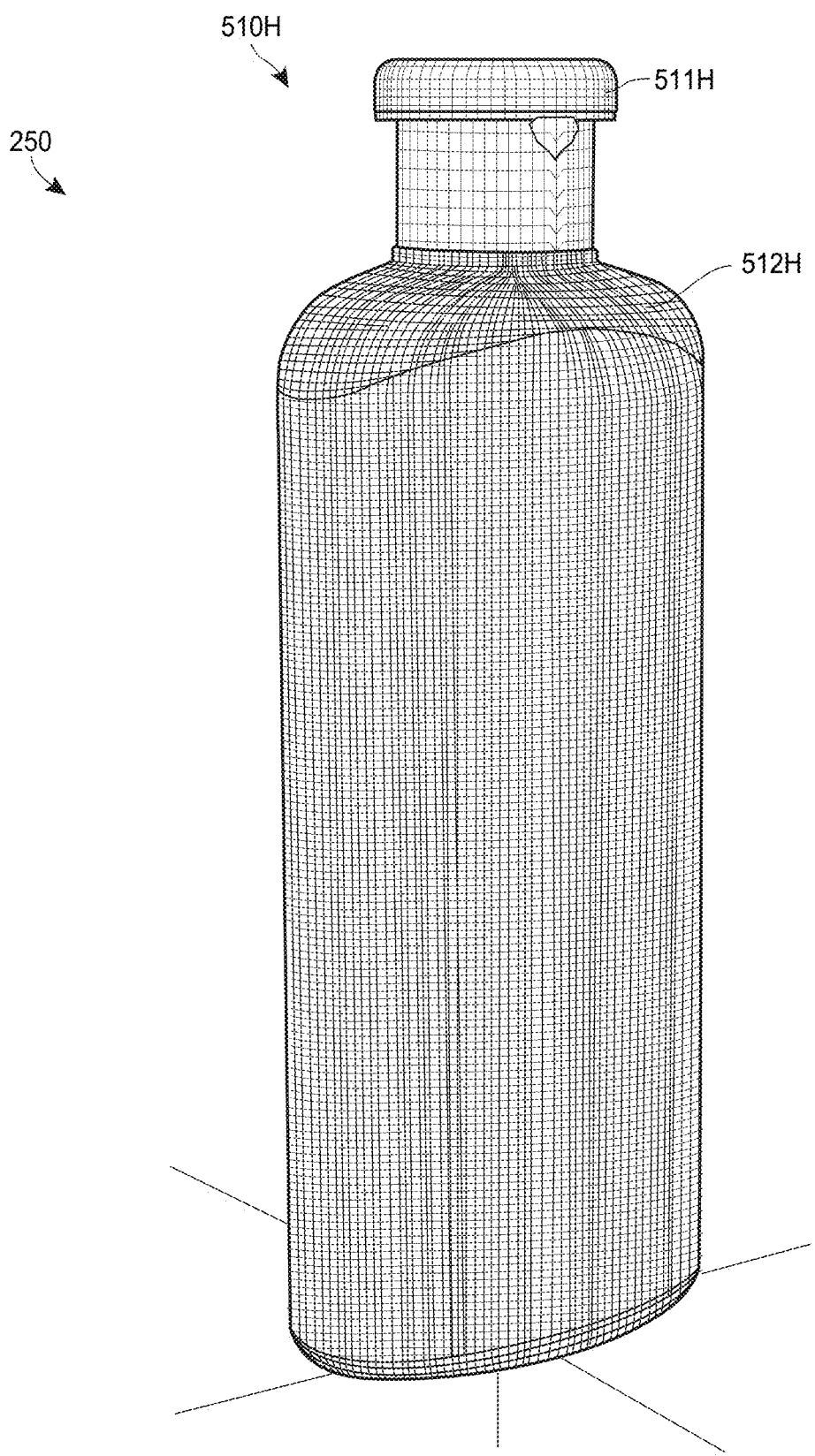
FIG. 5C illustrates a visualization or rendering of a high resolution polygonal model of a real-world product or product package created in accordance with flow diagram of FIG. 5A, and in accordance with various embodiments disclosed herein.

FIG. 5A illustrates a flow diagram 500 for generating high resolution and low resolution polygonal models of real-world products or product packages, in accordance with various embodiments disclosed herein. FIG. 5A, and related FIGS. 5B and 5C, illustrate an automated embodiment or version of the visual embodiments of FIGS. 4A and 4B. That is, at least in some embodiments, flow diagram 500 of FIG. 5A is implementable by processor(s) 104 without manual input. Additionally, or alternatively, however, flow diagram 500 may include both automatic or program execution and inputs from the visualization editor described for FIG. 4A. That is, flow diagram 500 may be implemented or augmented by a visualization editor, or its underlying software, packages, and/or APIs, including through software or scripts provided by the visualization editor and/or through interaction by a user of the visualization editor. Visualization editors, software, packages, and/or APIs that may be used with flow diagram 500 include those software packages, tools, and/or visualization editors as executable by MODO and COLORWAY as provided by Foundry Visionmongers Ltd., MAYA as provided by Autodesk, Inc., CINEMA 4D as provided by MAXON computer GmbH, or the like.

As shown for FIG. 5A, processor(s) 104, implementing flow diagram 500, are configured to generate a low resolution polygonal model 510L or a high resolution polygonal model 510H. In addition, processor(s) 104 may be configured to generate a further high resolution polygonal model 530H with virtual materials (e.g., physical materials/CMF 318) applied to the surface and/or environment of the high resolution polygonal model 530H. Each of these polygonal models may be generated from parametric-based CAD model 310 as described herein.

For example, in the embodiment of FIG. 5A, polygonal model generation script 502 may be invoked by processor(s) 104 to generate low resolution polygonal model 510L and/or a high resolution polygonal model 510H. To generate such models, polygonal model generation script 502 loads or accesses 3D imaging assets (CAD parts 311-313) from STP file 340 or from memory 106 and/or database 105. In addition, polygonal model generation script 502 loads or access weights/measurements 319 and perform any quality and assurance adjustments 504 regarding weights and/or measurements to parametric-based CAD model 310, including to its various components (e.g., CAD parts 311-313). For example, such quality and assurance adjustments 504 may be based on parametric information, for example as determined from parametric-based CAD model 310, or other 2D or 3D asset information and/or as stored in CAD XML file 350. Quality and assurance adjustments 504 may include processor(s) 104 increasing or decreasing line weights, scaling, orienting, and/or aligning components (e.g., CAD parts 311-313) and/or their measurements.

After application of the quality and assurance adjustments 504, processor(s) 104 may generate or convert 505 parametric-based CAD model 310 (or its component parts, e.g., CAD parts 311-313 as adjusted) to a polygonal model. For example, in various embodiments parametric-based CAD model 310 is a spline based model, where processor(s) 104 are configured to generate polygon surfaces or textures from the splines of parametric-based CAD model 310.

In some embodiments, a unified model 506 may be generated. Unified model 506 may be generated as a low resolution polygonal model 510L which has fewer polygons than high resolution models, resulting in a "rough" or low quality surface. For example, FIG. 5B illustrates a visualization or rendering of low resolution polygonal model 510L of a real-world product or product package (e.g., a shampoo bottle) created in accordance with flow diagram 500 of FIG. 5A, and in accordance with various embodiments disclosed herein. In the embodiment of FIG. 5B, each of CAD parts 511L and 512L is depicted as oriented and aligned such that low resolution polygonal model 510L is shown as a complete or whole (and accurately scaled) version of a real-world product or product package (e.g., the shampoo bottle as described for FIGS. 3A-3C and 4A and 4B). Similar to parametric-based CAD model 310, from which low resolution polygonal model 510L was generated, low resolution polygonal model 510L includes a polygon representation of CAD part 311 (rendered as polygon part 511L as a cap of a shampoo bottle) and CAD part 312 (rendered as polygon part 512L as a body of the shampoo bottle). Both of these components are shown as a virtual or 3D component that is part of low resolution polygonal model 510L. Positioning and application of CAD part 313 (rendering and application of a virtual a label of the shampoo bottle) is further described in FIGS. 6A and 6B herein.

In various embodiments, the low resolution polygonal model may be used to as preliminary or rough design sketch, as it requires less processing (e.g., by processor(s) 104) and memory resources (e.g., computer memory 106 and/or database 105) to generate a virtual model. Accordingly, low resolution polygonal model 510L may be generated quickly in order to determine if any errors have been made or to determine whether the design meets expectations. If not, a new low resolution polygonal model 510L may be regenerated as required or desired to fix errors, make adjustments, or design elements associated with the design of the real-world product and/or package (e.g., a shampoo bottle). This generally speeds up the design process and conserves computational resources upon which 3D modeling system 100 relies.

Additionally, or alternatively, as shown for FIG. 5A, polygonal model generation script 502 may generate a high resolution polygonal model 510H of a real-world product or product package (e.g., a shampoo bottle). For example, polygonal model generation script 502 may covert, or generate, parametric-based CAD model 310 from parametric-based CAD model 310 where a high number of polygons are mapped or generated from splines of parametric-based CAD model 310. With the higher number of polygons, the surface of high resolution polygonal model 510H more realistically represents a real-word product or package as compared to the low resolution polygonal model 510L.

FIG. 5C illustrates a visualization or rendering of a high resolution polygonal model of a real-world product or product package created in accordance with flow diagram 500 of FIG. 5A, and in accordance with various embodiments disclosed herein. In the embodiment of FIG. 5C, each of CAD parts 511H and 512H is depicted as oriented and aligned such that high resolution polygonal model 510H is shown as a complete or whole (and accurately scaled) version of a real-world product or product package (e.g., the shampoo bottle as described for FIGS. 3A-3C and 4A and 4B). Similar to parametric-based CAD model 310, from which high resolution polygonal model 510H was generated, high resolution polygonal model 510H includes a polygon representation of CAD part 311 (rendered as polygon part 511H as a cap of a shampoo bottle) and CAD part 312 (rendered as polygon part 512H as a body of the shampoo bottle). Both of these components are shown as a virtual or 3D component that is part of high resolution polygonal model 510H. Positioning and application of CAD part 313 (rendering and application of a virtual a label of the shampoo bottle) is further described in FIGS. 6A and 6B herein.

In some embodiments, both low resolution polygonal model 510L and high resolution polygonal model 510H may be saved or referenced together, e.g., in computer memory 106 and/or database 105, for later retrieval or access by processor(s) 104.

In various embodiments, one or more digital surface finish artifacts of a virtual material library 520, as selected from the 2D imaging assets, may be applied (522) to a polygonal model. For example, as shown in FIG. 5A, the physical materials/CMF 318 are applied (522), by processor(s) 104, to high resolution polygonal model 510H generate a virtual 3D model 810M of the real-world product or product package (e.g., shampoo bottle). Physical materials/CMF 318 may include product surface textures, print finishes, colors, appearances, and finishes (e.g., smooth, shiny, water, wood, metal, grain, etc.). Such Physical materials/CMF 318 may be stored in CAD XML file 350 for access by polygonal model generation script 502, processor(s) 104, and/or a 3D software of a visualization editors. The physical materials/CMF 318 values are applied to high resolution polygonal model 510H by adding the surface textures, print finishes, colors, appearances, etc. to the surface or other area of high resolution polygonal model 510H.

Figure 6A:
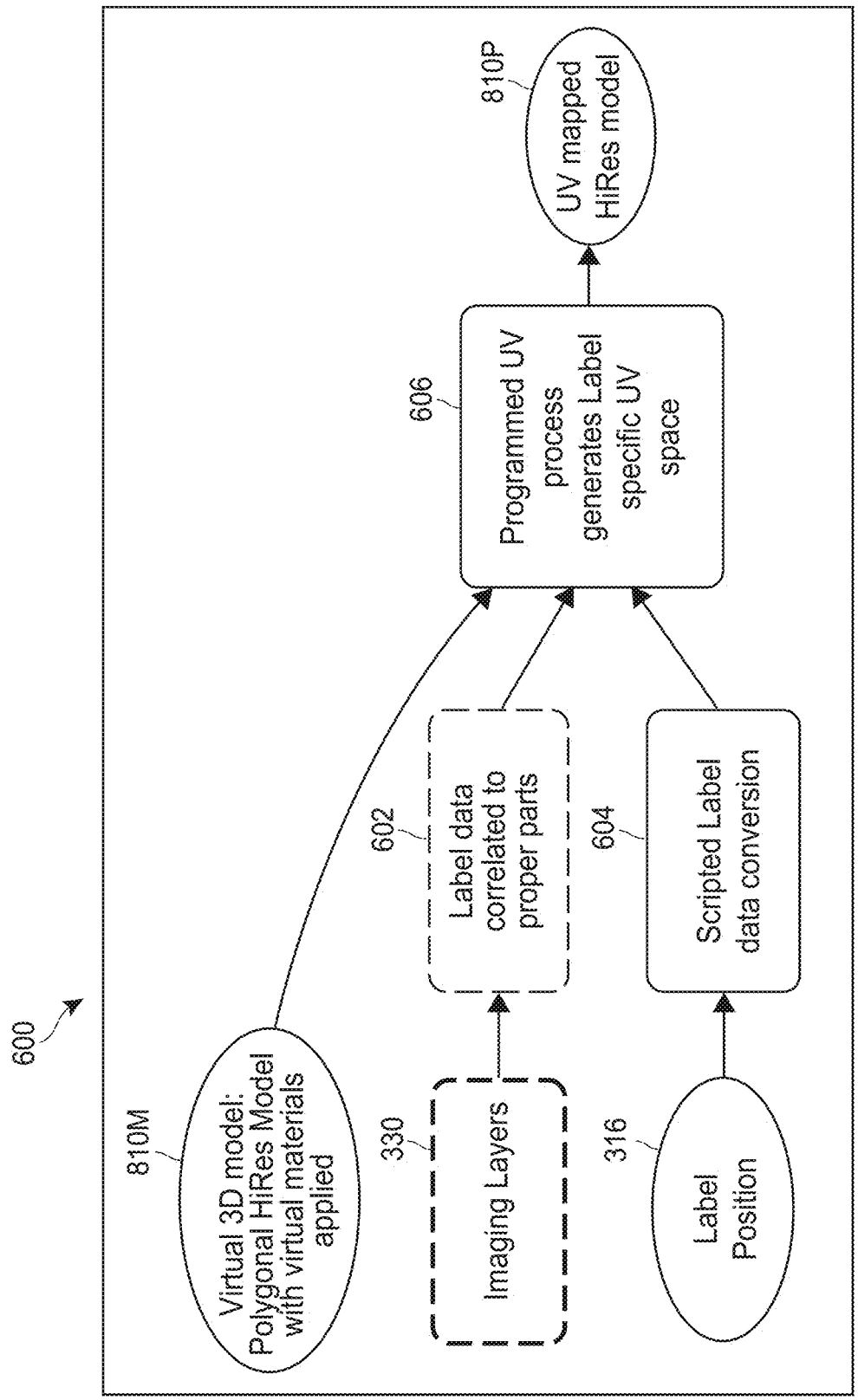
FIG. 6A illustrates a flow diagram for generating, based parametric information as described for a UV coordinate mapping corresponding to a virtual product label, in accordance with various embodiments disclosed herein.

FIG. 6A illustrates a flow diagram 600 for generating, based on parametric information as described for FIGS. 3A-3C, a UV coordinate mapping corresponding to a virtual product label, in accordance with various embodiments disclosed herein. In some embodiments, flow diagram 600 is implemented as a fully automated algorithm or script executed or implemented by processor(s) 104. Additionally, or alternatively, flow diagram 600 may be implemented or augmented by a visualization editor, or its underlying software, packages, and/or APIs, including through software or scripts provided by the visualization editor and/or through interaction by a user of the visualization editor. Visualization editors, software, packages, and/or APIs that may be used with flow diagram 600 include those software packages, tools, and/or visualization editors as executable by MODO and COLORWAY as provided by Foundry Visionmongers Ltd., MAYA as provided by Autodesk, Inc., and/or CINEMA 4D as provided by MAXON computer GmbH.

The parametric information may include label position 316, determined from parametric-based CAD model 310, as described for FIGS. 3A-3C. In addition, imaging layers 330, as described for FIGS. 3A-3C, may define sections (such as separations) of the CAD parts 311 to 313 for manipulation parts or components.

Parametric information (e.g., label position 316) and/or layers 330 may be used to map a virtual label (e.g., CAD part 313) to a polygonal model of a real-world product and/or package (e.g., virtual 3D model 810M). In the embodiment of FIG. 6A, processor(s) 104 preprocess label position 316 and layers 330. For example, at block 604 processor(s) 104 executes a script to convert label position 316 into information regarding artwork die-lines, and related die-line positions in 3D space. At block 602, processor(s) 104 determine basic packaging parts from layers 330. The packaging parts and die-line positions are then used to UV map and align a virtual label onto a polygonal model (e.g., virtual 3D model 810M).

Figure 6B:
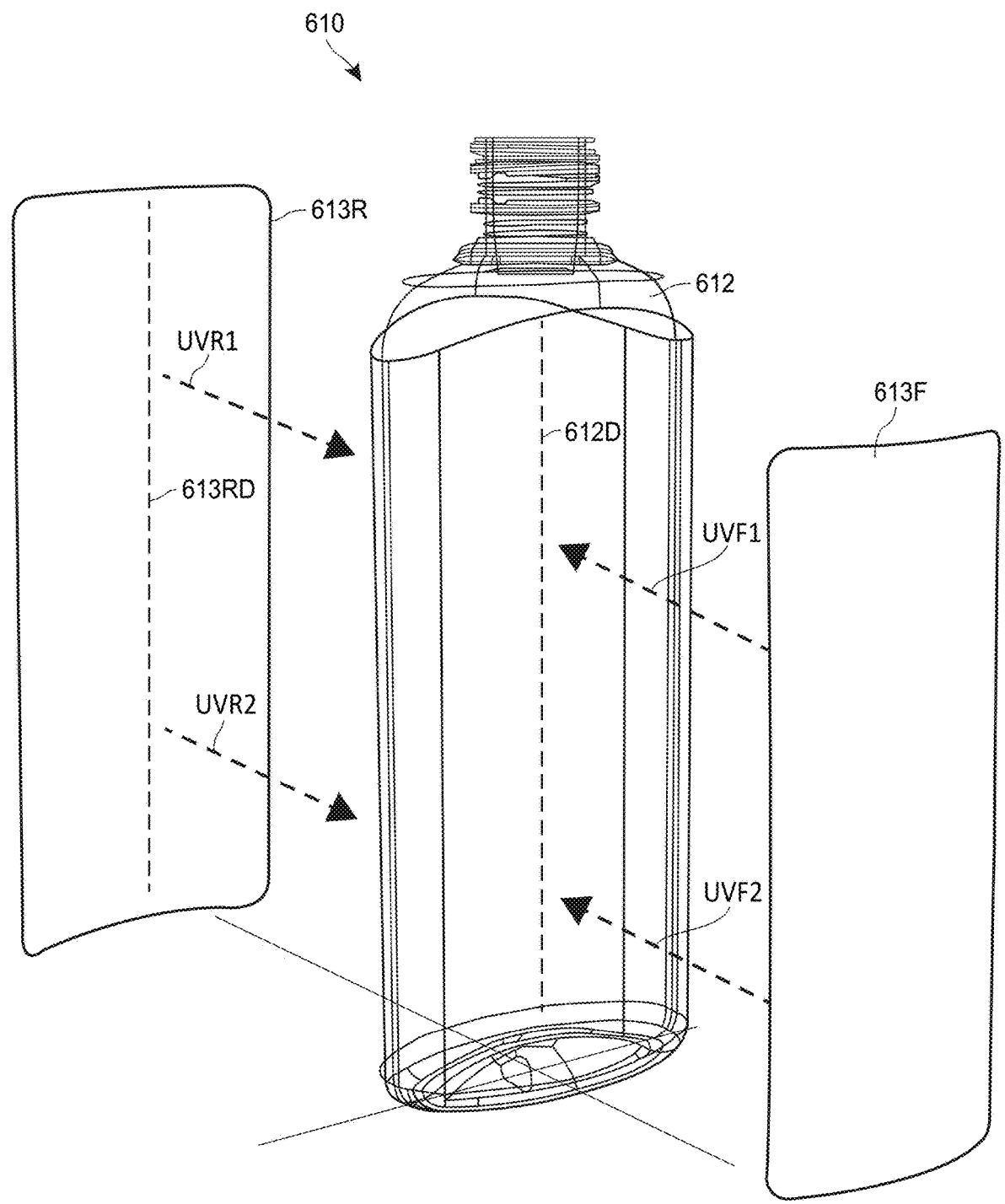
FIG. 6B illustrates a visualization or rendering of the UV coordinate mapping described for FIG. 6A, and in accordance with various embodiments disclosed herein.

FIG. 6B illustrates a visualization or rendering of the UV coordinate mapping described for FIG. 6A, and in accordance with various embodiments disclosed herein. For example, model 610 represents parametric information of the shape of virtual 3D model 810M. In some embodiments, model 610 corresponds to parametric-based CAD model 310, which includes CAD part 312 that corresponds to bottle body 612. In the embodiment of FIG. 6B, two virtual labels are UV mapped to bottle body 612. The two labels are front label 613F and rear label 613R. Either of front label 613F or rear label 613R may correspond to CAD part 313 (e.g., a 3D label) as described herein.

As shown in FIG. 6A, at block 606, processor(s) 104, using packaging parts (e.g., including dimensions of front label 613F and rear label 613R) and die-line positions (e.g., bottle die-line 612D and rear label die-line 613RD), executes programmed code to generate label specific UV space for UV mapping. Generally, the UV mapping prepares the polygons of the surface of virtual 3D model 810M for later application of colors, materials, surfaces, finishes, for example, as described herein for FIGS. 5A, 7A, and 7B. In particular, the UV mapping results in a UV texture map. The texture map includes or assigns surface tags to polygons that can be used to apply the colors, materials, surfaces, finishes, etc.

In the embodiment of FIGS. 6A and 6B, UV mapping includes mapping the surfaces of front label 613F and rear label 613R to the surface of bottle body 612. The UV mapping may also include tagging surfaces of the bottle body 612, label 613F, and/or rear label 613R. Tagging the surfaces or polygons allows processor(s) to apply colors or textures to specific polygons or areas of the respective surfaces of the bottle body 612, front label 613F, and/or rear label 613R. In addition, UV mapping may include mapping front label surface points, tags, or specific polygons (e.g., UVF1 and UVF2) from front label 613F to bottle body 612 and rear label surface points, tags, or polygons (e.g., UVR1 and UVR2) from rear label 613R to the surface, tags, or polygons of bottle body 612. In some embodiments, the front label surface points and the rear label surface points may be points chosen along the die-lines (e.g., bottle die-line 612D and rear label die-line 613RD) to ensure that the labels are correctly positioned on bottle body 612.

Together, using packaging parts (e.g., including dimensions of front label 613F and rear label 613R) as determined from layers 330, and die-line positions (e.g., bottle die-line 612D and rear label die-line 613RD) as determined from label position 316, enable automatic accurate placement of artwork of virtual labels into UV space for application or rendering on a virtual 3D model, e.g., virtual 3D model 810M. This allows for generation and rendering of virtual 3D models (e.g., virtual 3D model 810M) as photorealistic images (e.g., photorealistic image 810P, as shown for FIG. 9A) representing real-world products or product packages, complete with a photorealistic label.

Figure 7A:
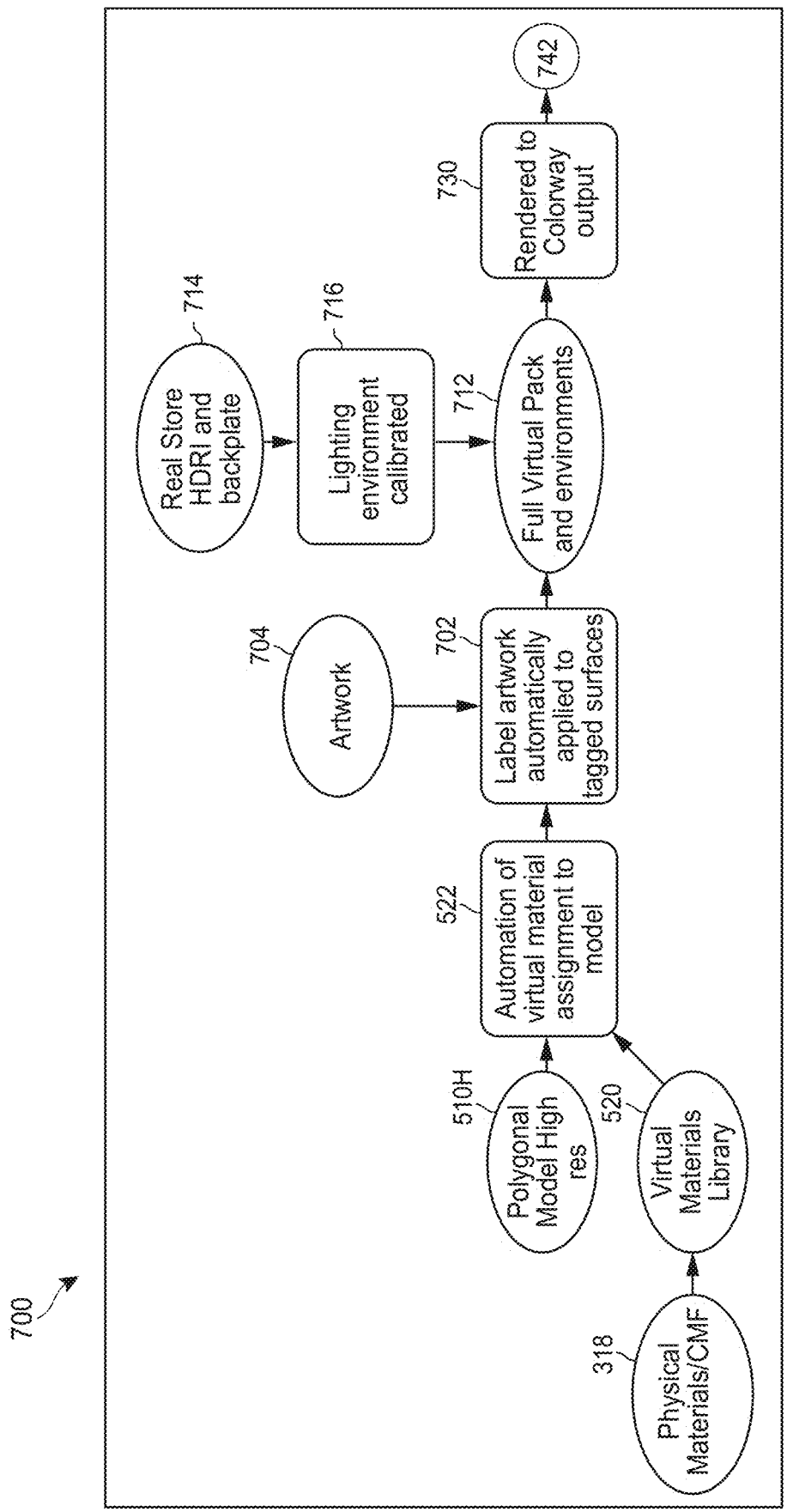
FIGS. 7A and 7B illustrate a flow diagram depicting application of one or more digital surface finish artifacts of a virtual material library, as selected from the 2D imaging assets, to a high resolution polygonal model as described for FIGS. 5A and 5C, in accordance with various embodiments disclosed herein.
Figure 7B:
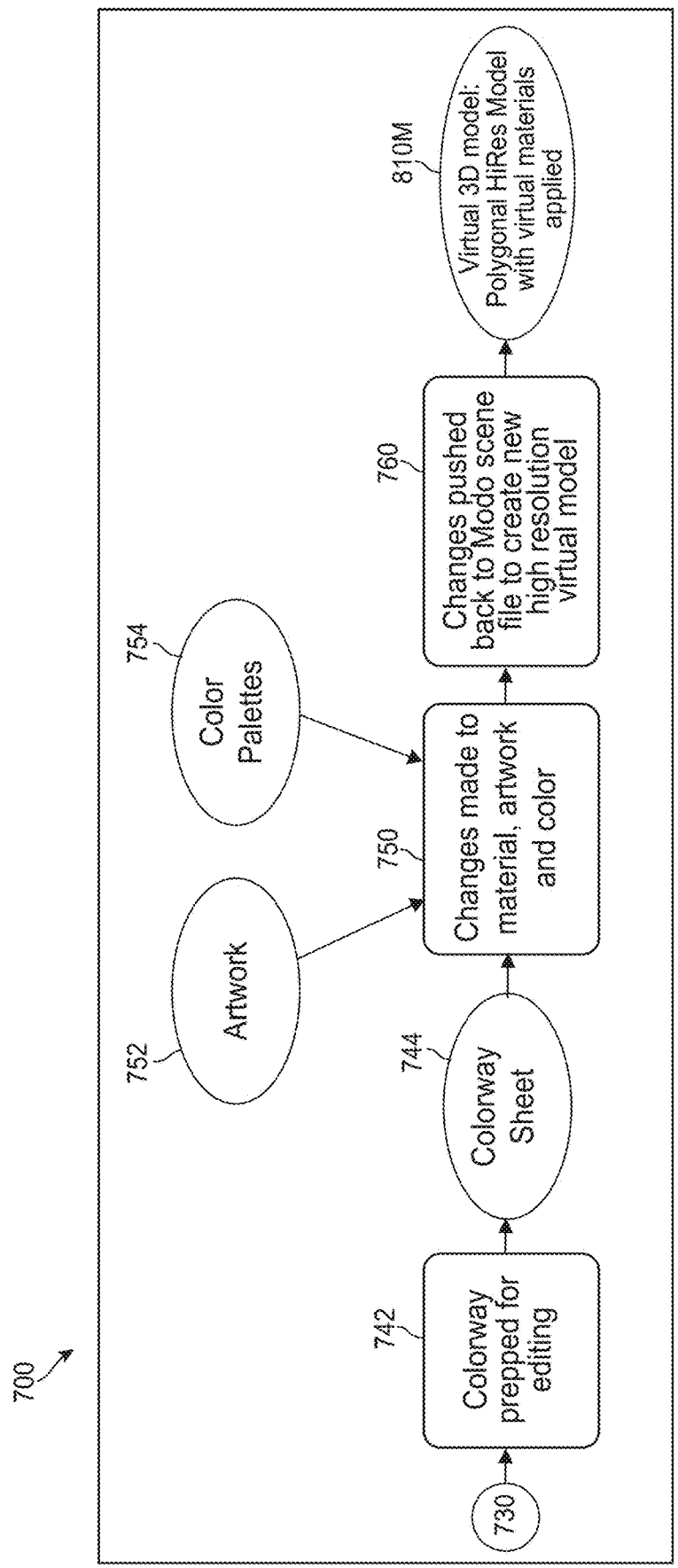

FIGS. 7A and 7B illustrate a flow diagram 700 depicting application of one or more digital surface finish artifacts of a virtual material library (e.g., virtual material library 520), as selected from the 2D imaging assets, to a high resolution polygonal model (e.g., high resolution polygonal model 510H) as described for FIGS. 5A and 5C, in accordance with various embodiments disclosed herein. Flow diagram 700 illustrates a second, more detailed embodiment of flow diagram 500 with respect to the application of one or more digital surface finish artifacts of a virtual material library (e.g., virtual material library 520), as selected from the 2D imaging assets, to a high resolution polygonal model (e.g., high resolution polygonal model 510H). In addition, flow diagram 700 describes generation, by processor(s) 104, of a virtual 3D model (e.g., virtual 3D model 810M) of the real-world product or product package based on a polygonal model (e.g., high resolution polygonal model 510H) and a UV coordinate mapping for a virtual product label (e.g., as described for FIGS. 6A and 6B).

In some embodiments, flow diagram 700 is implemented as a fully automated algorithm or script executed or implemented by processor(s) 104. Additionally, or alternatively, flow diagram 700 may be implemented or augmented by a visualization editor, or its underlying software, packages, and/or APIs, including through software or scripts provided by the visualization editor and/or through interaction by a user of the visualization editor. Visualization editors, software, packages, and/or APIs that may be used with flow diagram 600 include those software packages, tools, and/or visualization editors as executable by MODO and COLORWAY as provided by Foundry Visionmongers Ltd., MAYA as provided by Autodesk, Inc., PHOTOSHOP as provided by ADOBE INC, and/or CINEMA 4D as provided by MAXON computer GmbH.

As illustrated by FIG. 7A, diagram 700 includes processor(s) 104 accessing or loading, into or from database 105 and/or memorie(s) 106, physical materials/CMF 318, virtual material library 520, high resolution polygonal model 510H. As described for FIG. 5A, one or more digital surface finish artifacts of a virtual material library 520, as selected from the 2D imaging assets, are applied (522) to high resolution polygonal model 510H. For example, as shown in FIG. 7A, the physical materials/CMF 318 may be incorporated with or applied to virtual material library 520 and then automatically applied (522), by processor(s) 104, to high resolution polygonal model 510H. Physical materials/CMF 318 may include product surface textures, print finishes, colors, appearances, and finishes (e.g., smooth, shiny, water, wood, metal, grain, etc.). Such physical materials/CMF 318 may be stored in CAD XML file 350 for access by polygonal model generation script 502, processor(s) 104, and/or a 3D software of a visualization editors.

At block 702, processor(s) 104 loads artwork 704 into memorie(s) 106. Artwork 704 may include drawings, pictures, designs, or other such art that may be printed or otherwise included on a product and/or package, such as on the label of a product and/or package. In some embodiments, artwork 704 may be chosen that matches the 3D shape associated with high resolution polygonal model 510H.

By accessing the UV mapping, and related tagged areas or polygons, of high resolution polygonal model 510H, processor(s) 104 may map or otherwise apply artwork 704, including artwork for any labels (e.g., front label 613F and/or rear label 613R), to the surface of high resolution polygonal model 510H. For example, the UV mapping, of FIGS. 6A and 6B, can include assigning, tagging, or mapping pixel(s) of surface area(s) or polygon(s) of high resolution polygonal model 510H. Such tags or mapping may be then used to identify specific pixels and/or polygons, on the surface of high resolution polygonal model 510H, to apply artwork, colors, materials, finishes, etc. Rendering high resolution polygonal model 510H includes processors) 104 accessing the UV mapping, and its coordinates, to determine how to digitally paint or render the 3D surface of high resolution polygonal model 510H.

Similarly, by accessing the UV mapping, and related tagged areas or polygons, of high resolution polygonal model 510H, processor(s) 104 may map or otherwise apply materials or finishes, including those of physical materials/CMF 318 and/or virtual material library 520, to the surface of high resolution polygonal model 510H. In some embodiments, these materials or finishes may be applied to specific artwork 704 to improve or enhance the 3D image quality of the high resolution polygonal model 510H.

In such embodiments, artwork 704 may be split into masks or polygons in order for processor(s) 104 to apply different finishes or colors swatches to match materials. If masks are used, processor(s) 104 may select corresponding virtual materials based artwork 704 that is applied to high resolution polygonal model 510H.

At block 712, processor(s) 104 may apply, or prepare for rendering, back plates or background images 714 and/or lighting effects 716 with respect to high resolution polygonal model 510H. Generally, a back plate or background image 714 is a high resolution 2D image within which 3D models (e.g., high resolution polygonal model 510H) can be integrated or otherwise displayed. A back plate or background image may be designed and/or generated by a visualization editor (e.g., MODO) and/or its underlying software or APIs to create a scene within which a 3D model may be rendered or represented as a photorealistic image. In some embodiment, a scene may be a "real store" scene where a 3D model and/or photorealistic image is rendered as depicted on a virtual store shelf or other retail environment. Still further, a background or back plate image may be implemented as a high dynamic range image (HDRI). And HDRI image combines luminosity across a broad color spectrum to provide real-world quality images.

In some embodiments, processor(s) 104 may apply lighting effects 716 using HDRI (714) to match the polygonal model 510H into a back plate (e.g., of back plates or background images 714). For example, this includes processor(s) 104 adding one or more light sources such that high resolution polygonal model 510H may be rendered as illuminated within the back plates or background images 714 by the specified light sources. For example, in some embodiments, this may include identifying and/or aligning camera scenes of the high resolution polygonal model 510H within an environment of the back plates or background images 714, and calibrating lighting intensity to correspond to HDRI values and virtual material(s) and/or finishe(s) of the high resolution polygonal model 510H. In some embodiments, processors 104 may load, from memorie(s) 106, a preset list of cameras, back plates, and/or HDRI environments for particular models, components, parts, etc. based on GTIN identifiers for such models, components, parts.

At block 730, processor(s) 104 saves, e.g., in database 105 and/or memorie(s) 106, high resolution polygonal model 510H and its one or more digital surface finish artifacts, as generated with physical materials/CMF 318, virtual material library 520 back plates or background images 714, and/or lighting effects 716. The information is saved for use by a visualization editor (e.g., COLORWAY) and/or its underlying 3D software or APIs. In some embodiments, meta-tags are used to code surfaces or polygons, or references thereto, of high resolution polygonal model 510H for use in coloring such surfaces or areas. For example, in some embodiments, COLORWAY element files be stored and meta-tagged in a database (e.g., database 105).

Referring to FIG. 7B, at block 742, as part of flow diagram 700, processor(s) 104 accesses back plates or background images 714 and/or lighting effects 716 for updating and/or rendering color or chromatic properties of high resolution polygonal model 510H. For example, in some embodiments a COLORWAY element file, with meta-tags identifying surfaces or areas of high resolution polygonal model 510H for coloring, may loaded or populated.

At block 750, processor(s) 104 apply the colors of a color sheet 744 (e.g., COLORWAY sheet) to the high resolution polygonal model 510H. Color sheet 744 may be loaded or accessed by processors 104($s$), from memorie(s) 106, and may define color(s) to be applied, e.g., virtually painted, on surfaces or areas (e.g., polygons or pixels) of high resolution polygonal model 510H. For example, color may be applied to artwork 752 (which may include artwork 704, e.g., drawings, pictures, etc., as described for FIG. 7A). In addition, color palettes 754, which may include different color sets, such as pre-defined color sets of matching or complementary colors for application to products and/or packages, may be loaded, by processor(s) 104, and applied, or used to paint, high resolution polygonal model 510H. In some embodiments, a user may select colors or color palettes from a visualization editor for application to high resolution polygonal model 510H, including to the materials, finishes, artwork, or other surface changes applied to high resolution polygonal model 510H as described herein.

At block 760, color changes and/or selections, as determined from blocks 742 and 750, may be automatically pushed to, or loaded by, 3D software (e.g., MODO) for generation of virtual 3D model 810M. In various embodiments, virtual 3D model 810M is a high resolution polygonal model (e.g., high resolution polygonal model 510H) with virtual materials, finishes, artwork (e.g., artwork for or comprising labels, flexible wrappers, etc.), colors, and other surface elements or object, as described herein, applied such that virtual 3D model 810M renders, e.g., on a graphic display, as a photorealistic image representing a real-world product or product package (e.g., shampoo bottle).

Figure 8A:
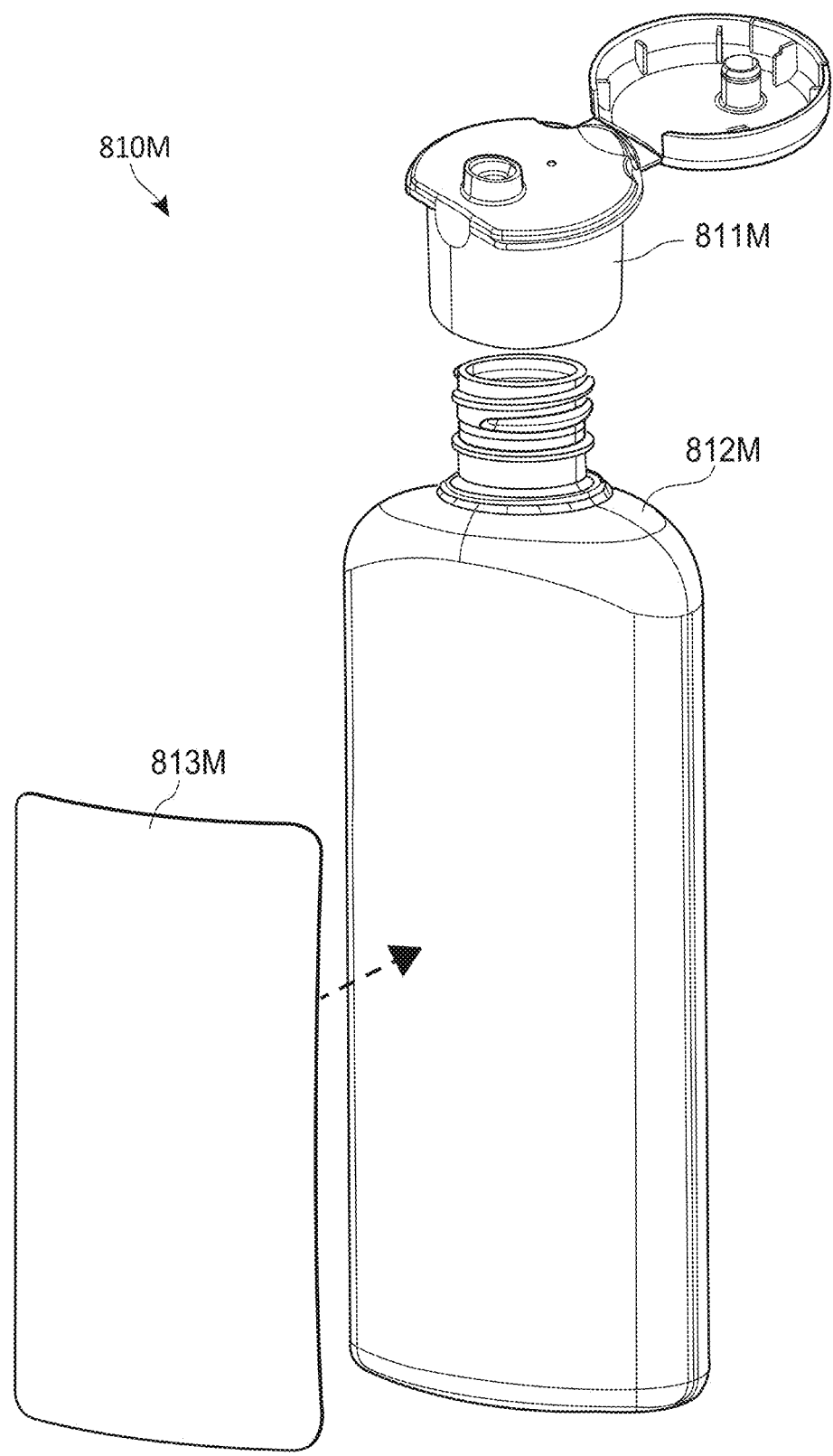
FIG. 8A illustrates a visualization or rendering of an exploded view of a virtual 3D model of a real-world product or product package as generated from a polygonal model as described herein for any of FIGS. 4A, 4B, 5A, 5C, and/or 7A and 7B, and in accordance with various embodiments disclosed herein.

FIG. 8A illustrates a visualization or rendering of an exploded view of a virtual 3D model (e.g., virtual 3D model 810M) of a real-world product or product package as generated from a polygonal model as described herein for any of FIGS. 4A, 4B, 5A, 5C, and/or 7A and 7B, and in accordance with various embodiments disclosed herein. As illustrated for FIG. 8A, each of finished parts 811M, 812M, and 813M is depicted in an exploded view of a real-world product or product package (e.g., the shampoo bottle as described for FIGS. 3A-3C, 4A and 4B, 5A-5C, and 7A and 7B). Similar to high resolution polygonal model 510M, from which virtual 3D model 810M was generated, virtual 3D model 810M is a polygon model including finished part 811M (rendered as a cap of a shampoo bottle); finished part 812M (rendered as a body of the shampoo bottle); and finished part 813M (rendered as a label of the shampoo bottle), which is mapped onto finished part 812M with the UV mapping as described herein for FIGS. 6A and 6B. Each of these finished parts is shown as a virtual or 3D component that is part of virtual 3D model 810M. In various embodiments, virtual 3D model 810M, and/or its individual component parts (e.g., 811M, 812M, and 813M) may be rendered, via a graphical display, as a photorealistic image representing the real-world product or product package (e.g., shampoo bottle). A photorealistic image can be a photographic image or a 3D image of the real-world product or product package.

Figure 8B:
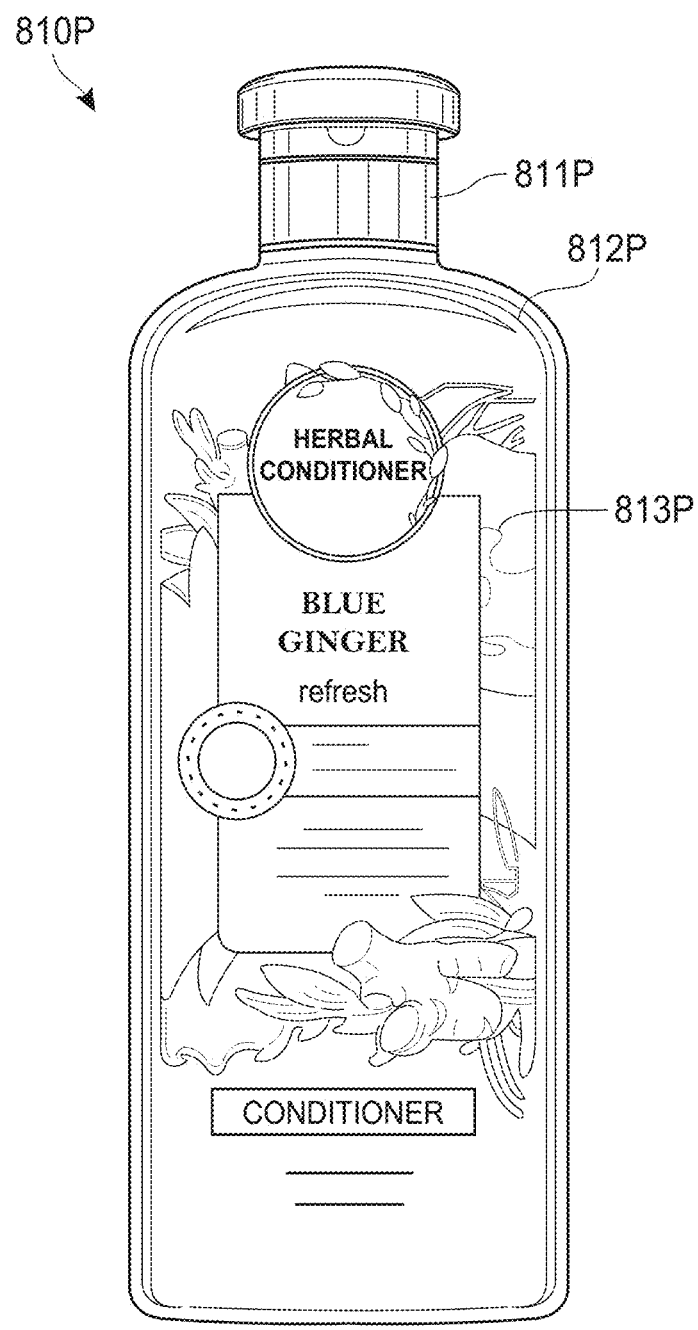
FIG. 8B illustrates a visualization or rendering of a photorealistic image representing the real-world product or product package as described for FIG. 8A, in accordance with various embodiments disclosed herein.

FIG. 8B illustrates a visualization or rendering of a photorealistic image 810P representing the real-world product or product package as described for FIG. 8A, in accordance with various embodiments disclosed herein. In the embodiment of FIG. 8B, photorealistic image 810P is a front view of virtual 3D model 810M, but rendered as a complete (non-exploded) view. That is, photorealistic image 810P is a rendering, on a graphical display, of a photorealistic image of a front view image representing the real-world product or product package (e.g., shampoo bottle). As illustrated for FIG. 8B, each of finished parts 811P, 812P, and 813P is depicted as completed version of a real-world product or product package (e.g., the shampoo bottle as described for FIGS. 3A-3C, 4A and 4B, 5A-5C, and 7A and 7B, and 8A).

Similar to high resolution polygonal model 510H, from which photorealistic image 810P was generated and rendered, photorealistic image 810P is a front view of a polygon model including finished part 811P (rendered as a cap of a shampoo bottle); finished part 812P (rendered as a body of the shampoo bottle); and finished part 813P (rendered as a label of the shampoo bottle). Each of these finished parts (e.g., 811P, 812P, and 813P) is shown from a front view perspective with its finishes and materials applied. For example, each of physical materials/CMF 318 values added, including the surface textures, print finishes, colors, appearances, etc. to the surface of virtual 3D model 810M, and, thus, to its respective front view, i.e., photorealistic image 810P. For example, in the embodiment of FIG. 8B, a metallic texture or finish may be added to finished part 811P (bottle cap) and its top portion is colored black. In addition, finished part 812P (bottle body) may be colored blue. In addition, artwork (e.g., artwork 704 and/or 752), such as pictures and drawings (e.g., including a logo, flowers, vitamins, seals, graphical text, and other graphics related to the product) are added to finished part 813P (label). Together, each of these finished parts, with related artwork and finishes provides a rendering of a photorealistic image of the real-world shampoo bottle.

Figure 9A:
FIG. 9A illustrates a visualization or rendering of the photorealistic image of the real-world product or product package as described for FIGS. 8A and 8B as rendered within a first image scene, in accordance with various embodiments disclosed herein.

FIG. 9A illustrates a visualization or rendering of the photorealistic image (e.g., photorealistic image 810P) of the real-world product or product package as described for FIGS. 8A and 8B as rendered within a first image scene (e.g., scene 902), in accordance with various embodiments disclosed herein. Scene 902 includes a background or back plate image of leaves. However, it is to be understood that additional and/or alternative background(s) and/or back plate image(s) may be utilized. Such additional and/or alternative background(s) may include any of a variety of scenes, images, backgrounds, colors, etc. for placement, display, or otherwise rendering with a photorealistic image (e.g., photorealistic image 810P). Scene 902 may be included or rendered together with photorealistic image 810P as described for back plates or background images 714 of FIG. 7A herein. In this way, a view (or multiple views) of virtual 3D model 810M may be rendered with back plates or background images 714 for scene 902. For example, as shown for FIG. 9A, virtual 3D model 810M may be rendered as a front view (i.e., photorealistic image 810P) against scene 902. In another embodiment (not shown), a different background or back plate may be chosen or selected (e.g., at block 712 of FIG. 7A) such that virtual 3D model 810M may be rendered as a front view (i.e., photorealistic image 810P) against the different background or back plate (e.g., a beach or sand scene).

Figure 9B:
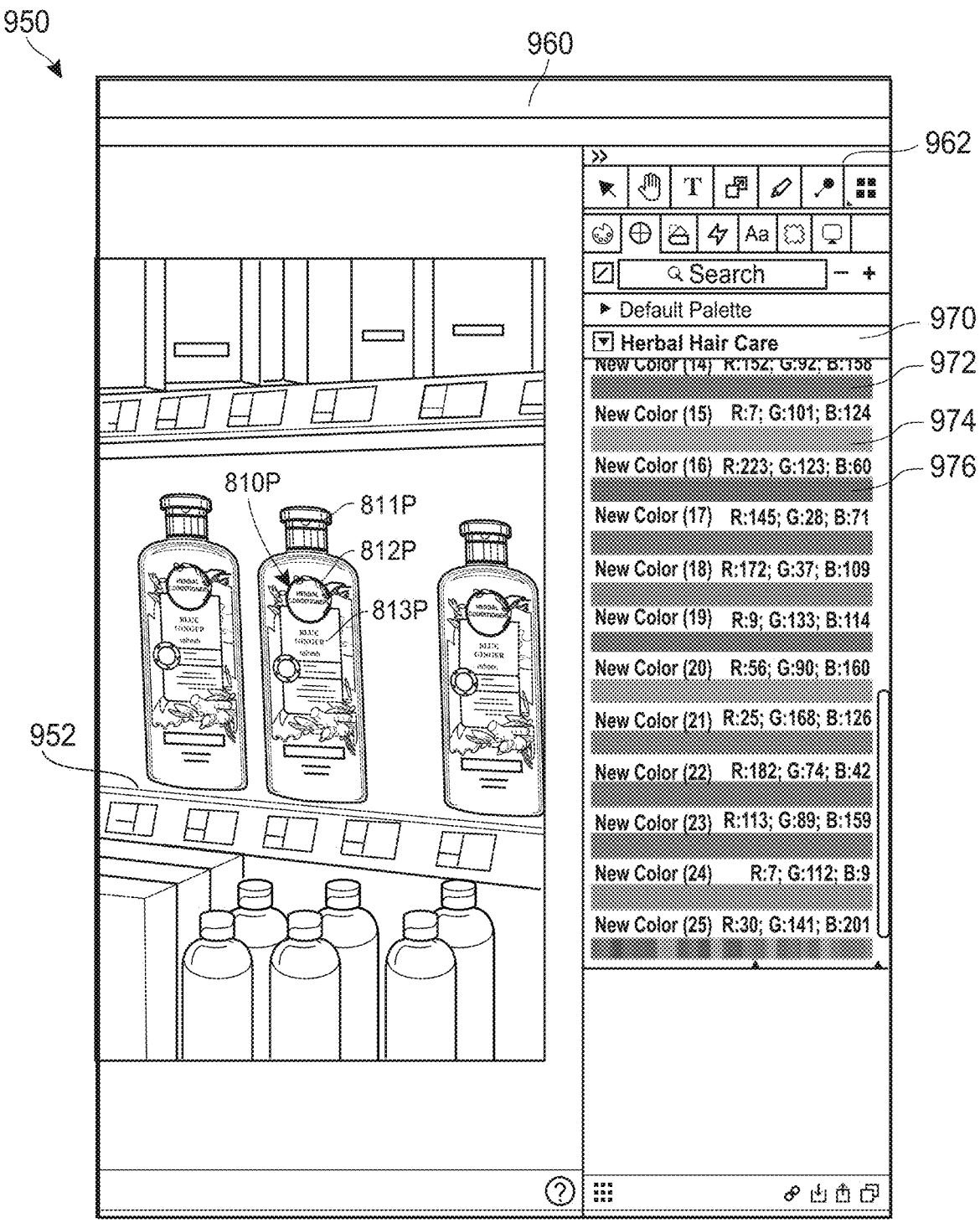
FIG. 9B illustrates a visualization or rendering of the photorealistic image of the real-world product or product package as described for FIGS. 8A and 8B as rendered within a second image scene, and further illustrates an example visualization editor, in accordance with various embodiments disclosed herein.

FIG. 9B illustrates a visualization or rendering of the photorealistic image (e.g., photorealistic image 810P) of the real-world product or product package as described for FIGS. 8A and 8B as rendered within a second image scene (e.g., scene 952), and further illustrates an example visualization editor (e.g., visualization editor 960), in accordance with various embodiments disclosed herein. For example, scene 952 illustrates a retail store shelf with photorealistic image 810P. Accordingly, the scene 952 differs from scene 902, and demonstrates the flexibility of 3D modeling system 100 to render virtual 3D model 810M within various, different scenes. Scene 952 may be included or rendered together with photorealistic image 810P as described for back plates or background images 714 of FIG. 7A herein. In this way, a view (or multiple views) of virtual 3D model 810M may be rendered with back plates or background images 714 for scene 952. For example, as shown for FIG. 9B, virtual 3D model 810M may be rendered as a perspective view (i.e., photorealistic image 810P) on the retail shelf of scene 952, where virtual 3D model 810M was rotated in 3D space and captured as a photorealistic image within scene 952.

FIG. 9B also depicts visualization editor 960, which is shown as an embodiment of a COLORWAY visualization editor. Generally, a visualization editor as described herein, is configured to receive user selections to manipulate any of a shape of the virtual 3D model, a virtual material of virtual 3D model, a finish of the virtual 3D model, a color of the virtual 3D model, or the virtual product label. In this way, a photorealistic image, via its underlying model, may be provided to a guided user interface (GUI) to enable a user to provide selections to manipulate, e.g., in real time, a material of the photorealistic product, the finish of the photorealistic product, or the virtual product label of the photorealistic product. Upon manipulation of the photorealistic image, via its underlying model, processor(s) 104 may generate, render, with the one or more processors, a new virtual 3D model, and new photorealistic image, based on the user selections. In various embodiments, the new virtual 3D model may represent a new product or product package corresponding to the user selections. In still further embodiments, a virtual 3D model, such as a virtual 3D model as created or generated described herein, may be stored in memory (e.g., memorie(s) 106 and/or database 105) such that the virtual 3D model is accessible to an automatic imaging asset assembly script or the visualization editor for future iterations or for future design. In such embodiments, for example, each of the parts or components (e.g., 811M, 812M, and/or 813M) of virtual 3D model 810M, may be tagged or assigned GTIN identifiers such that an automatic imaging asset assembly script may access the parts or comments for future designs. Each of parts or components (e.g., 811M, 812M, and/or 813M) of virtual 3D model 810M may be assigned or classified to a pre-defined design shape for future reference by automatic imaging asset assembly script. In this way, an automatic imaging asset assembly script or the visualization editor is configured to generate one or more additional or new virtual 3D models corresponding to one or more additional or new real-world products or product packages In the embodiment of FIG. 9B, visualization editor 960 includes editing options or tools 962 that a user can select to modify or change or modify finishes, colors, materials, etc. of virtual 3D model 810M as described herein. In addition, visualization editor 960 includes an example of a color palette 970 (e.g., as selected color palettes 754 of FIG. 7B). In particular, color palette 970 is a specific color palette for the brand HERBAL ESSENCES, which the brand is corresponding to the real-world product and/or package (e.g., the shampoo bottle as described for various Figures herein). Color palette 970 includes a standard or pre-defined set of colors (e.g., 972, 974, and 976, etc.) that defines the HERBAL ESSENCES brand. A user may modify these colors via visualization editor 960, e.g., for any changes or updates to the design or branding of the HERBAL ESSENCES brand.

Figure 10:
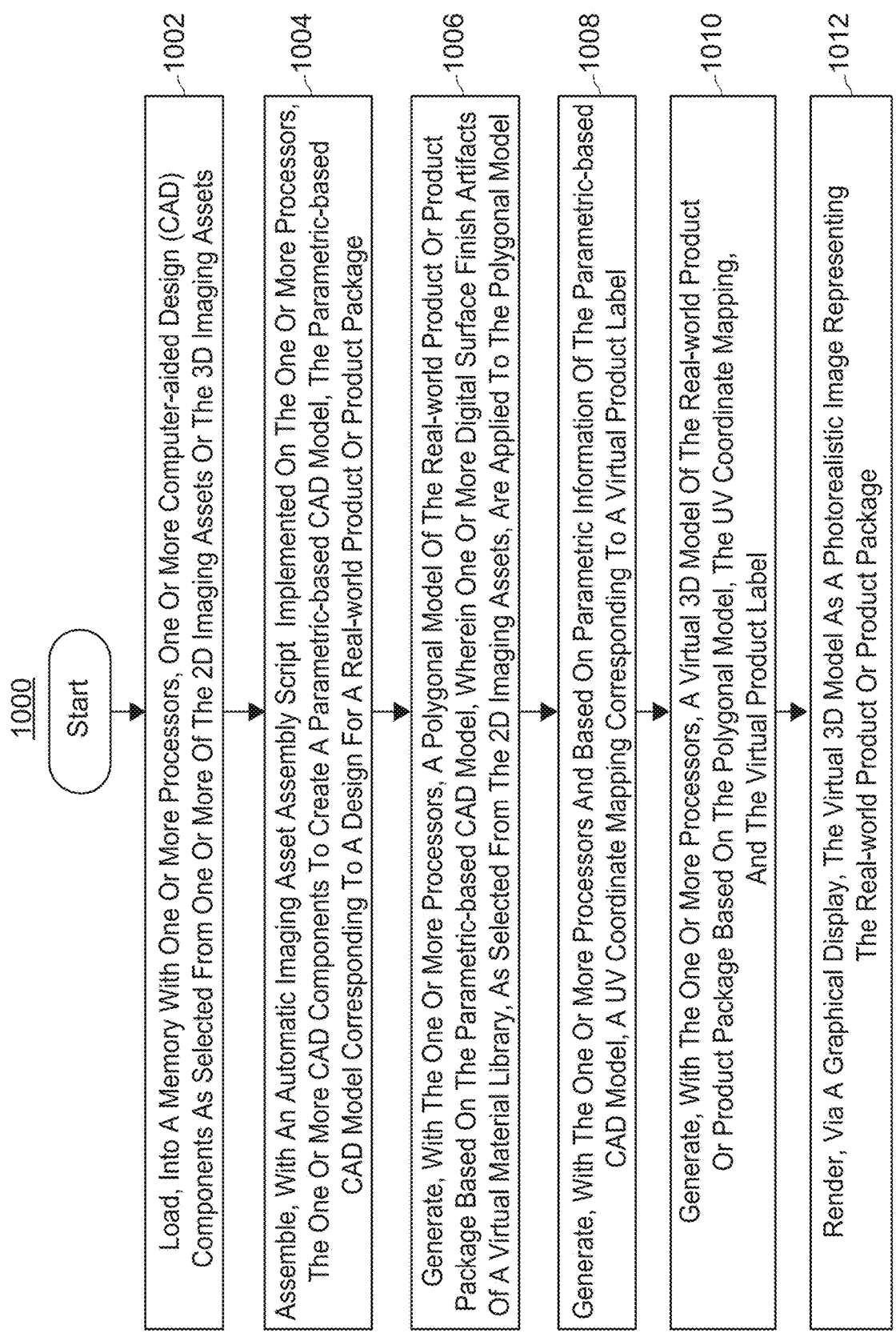
FIG. 10 illustrates a flow diagram or algorithm of an example 3D modeling method for automatically generating photorealistic, virtual 3D package and product models from 3D and 2D imaging assets, in accordance with various embodiments disclosed herein.

FIG. 10 illustrates a flow diagram or algorithm of an example 3D modeling method 1000 for automatically generating photorealistic, virtual 3D package and product models from 3D and 2D imaging assets, in accordance with various embodiments disclosed herein.

At block 1002, 3D modeling method 1000 includes loading, into a memory (e.g., memorie(s) 106 and/or database 105) with one or more processors (e.g., processor(s) 104), one or more computer-aided design (CAD) components (e.g., CAD part 311, CAD part 312, and/or CAD part 313) as selected from one or more of the 3D imaging assets.

At block 1004, 3D modeling method 1000 further includes assembling, with an automatic imaging asset assembly script (e.g., automatic imaging asset assembly script 302) implemented on the one or more processors (e.g., processor(s) 104), the one or more CAD components (e.g., CAD part 311, CAD part 312, and/or CAD part 313) to create a parametric-based CAD model (e.g., parametric-based CAD model 310). The parametric-based CAD model may correspond to a design for a real-world product or product package (e.g., a shampoo bottle, as described in various embodiments herein).

At block 1006, 3D modeling method 1000 further includes generating, with the one or more processors (e.g., processor(s) 104), a polygonal model (e.g., high resolution polygonal model 510H) of the real-world product or product package based on the parametric-based CAD model (e.g., parametric-based CAD model 310). One or more digital surface finish artifacts (e.g., physical materials/CMF 318) of a virtual material library (e.g., virtual material library 520), as selected from the 2D imaging assets, may be applied to the polygonal model (e.g., high resolution polygonal model 510H).

At block 1008, 3D modeling method 1000 further includes generating, with the one or more processors (e.g., processor(s) 104) and based on parametric information of the parametric-based CAD model (e.g., parametric-based CAD model 310), a UV coordinate mapping corresponding to a virtual product label (e.g., front label 613F or rear label 613R).

At block 1010, 3D modeling method 1000 further includes generating, with the one or more processors, a virtual 3D model (e.g., virtual 3D model 810M) of the real-world product or product package based on the polygonal model (e.g., high resolution polygonal model 510H), the UV coordinate mapping, and the virtual product label (e.g., front label 613F or rear label 613R).

At block 1012, 3D modeling method 1000 further includes rendering, via a graphical display (e.g., terminal 109), the virtual 3D model as a photorealistic image (e.g., photorealistic image 810P) representing the real-world product or product package.

In some embodiments, processor(s) 104 are configured to initiate creation of at least a portion of the real-world product or product package (e.g., shampoo bottle) based on the virtual 3D model (e.g., virtual 3D model 810M). In such embodiments, a 3D printer (e.g., local 3D printer 107 and/or remote 3D printer 157) may load the virtual 3D model to create or print the real-world product or product package (or portion thereof) based on the virtual 3D model. Additionally, or alternatively, a virtual 3D model may be transmitted via a computer network (e.g., computer network 120) to a process plant (e.g., process plant 162) for creation, manufacture, or production of at least a portion of the real-world product or product package at the process plant. For example, in some embodiments, the virtual 3D model is used to generate a mold or part (e.g., mold 162m). The mold (e.g., mold 162m) may then be used to manufacture or make, e.g., at the process plant (e.g., process plant 162) a physical item (e.g., a rigid and/or plastic bottle) and/or portions or parts thereof.

Additional Considerations

Although the disclosure herein sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiples of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. A person of ordinary skill in the art may implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A three-dimensional (3D) modeling system configured to automatically generate photorealistic, virtual 3D package and product models from 3D and two-dimensional (2D) imaging assets, the 3D modeling system comprising:
  one or more processors;
  an automatic imaging asset assembly script configured to execute on the one or more processors; and
  a memory configured to store 2D imaging assets and 3D imaging assets accessible by the automatic imaging asset assembly script,
  wherein the one or more processors are configured to:
  receive a user submission as selected by the user from a user interface (UI) defining a predefined design shape, the user submission causing a search for and return of a parts list comprising information selected from one or more computer-aided design (CAD) components of 2D imaging assets or 3D imaging assets as stored in a database, wherein the search causes the one or more processors to identify corresponding, new, or additional 2D imaging assets or 3D imaging assets for the returned parts lists that match or are within a given threshold of the predefined shape as selected by the user from the UI;
  load, into a memory, the one or more CAD components as identified for the predefined design shape as submitted;
  assemble, with the automatic imaging asset assembly script, the one or more CAD components to create a parametric-based CAD model, the parametric-based CAD model corresponding to a design for a real-world product or product package;
  generate a polygonal model of the real-world product or product package based on the parametric-based CAD model, wherein one or more digital surface finish artifacts of a virtual material library, as selected from the 2D imaging assets, are applied to the polygonal model;
  generate, based on parametric information of the parametric-based CAD model, a UV coordinate mapping corresponding to a virtual product label;
  generate a virtual 3D model of the real-world product or product package based on the polygonal model, the UV coordinate mapping, and the virtual product label; and
  render, via a graphical display, the virtual 3D model as a photorealistic image representing the real-world product or product package.

2. The 3D modeling system of claim 1, wherein the virtual 3D model is a high resolution polygonal model representing of the real-world product or product package.

3. The 3D modeling system of claim 1, wherein the one or more processors are further configured to initiate creation of at least a portion of the real-world product or product package based on the virtual 3D model.

4. The 3D modeling system of claim 3 further comprising creating, with a 3D printer, at least a portion of the real-world product or product package based on the virtual 3D model.

5. The 3D modeling system of claim 3 further comprising transmitting via a computer network to a process plant the virtual 3D model for creation of at least a portion of the real-world product or product package.

6. The 3D modeling system of claim 1 further comprising a server comprising at least one processor of the one or more processors, wherein at least a portion of the 2D imaging assets or the 3D imaging assets are retrieved via a computing network.

7. The 3D modeling system of claim 1, wherein the one or more processors are further configured to launch a visualization editor, the visualization editor configured to load into memory, or render on the graphical display, any one or more of the one or more CAD components, the parametric information, the parametric-based CAD model, the polygonal model, the UV coordinate mapping, the virtual product label, or the virtual 3D model.

8. The 3D modeling system of claim 7, wherein the visualization editor is configured to receive user selections to manipulate any of a shape of the virtual 3D model, a virtual material of virtual 3D model, a finish of the virtual 3D model, a color of the virtual 3D model, or the virtual product label.

9. The 3D modeling system of claim 8, wherein the one or more processors are further configured to generate or render a new virtual 3D model based on the user selections, the new virtual 3D model representing a new product or product package corresponding to the user selections.

10. The 3D modeling system of claim 9, wherein the one or more processors are further configured to store the virtual 3D model in memory such that the virtual 3D model is accessible to the automatic imaging asset assembly script or the visualization editor, the automatic imaging asset assembly script or the visualization editor configured to generate one or more additional virtual 3D models corresponding to one or more additional real-world products or product packages.

11. A three-dimensional (3D) modeling method for automatically generating photorealistic, virtual 3D package and product models from 3D and two-dimensional (2D) imaging assets, the 3D modeling method comprising:
  receiving, by one or more processors, a user submission as selected by the user from a user interface (UI) defining a predefined design shape, the user submission causing a search for and return of a parts list comprising information selected from one or more computer-aided design (CAD) components of 2D imaging assets or 3D imaging assets as stored in a database, wherein the search causes the one or more processors to identify corresponding, new, or additional 2D imaging assets or 3D imaging assets for the returned parts lists that match or are within a given threshold of the predefined shape as selected by the user from the UI;
  loading, into a memory with the one or more processors, the one or more CAD components as identified for the predefined design shape as submitted;
  assembling, with an automatic imaging asset assembly script implemented on the one or more processors, the one or more CAD components to create a parametric-based CAD model, the parametric-based CAD model corresponding to a design for a real-world product or product package;
  generating, with the one or more processors, a polygonal model of the real-world product or product package based on the parametric-based CAD model, wherein one or more digital surface finish artifacts of a virtual material library, as selected from the 2D imaging assets, are applied to the polygonal model;
  generating, with the one or more processors and based on parametric information of the parametric-based CAD model, a UV coordinate mapping corresponding to a virtual product label;
  generating, with the one or more processors, a virtual 3D model of the real-world product or product package based on the polygonal model, the UV coordinate mapping, and the virtual product label; and
  rendering, via a graphical display, the virtual 3D model as a photorealistic image representing the real-world product or product package.

12. The 3D modeling method of claim 11, wherein the one or more CAD components are loaded in memory based on the predefined design shape corresponding to the real-world product or product package.

13. The 3D modeling method of claim 12, wherein a selection of the predefined design shape causes the one or more processors to select and execute the automatic imaging asset assembly script, wherein the automatic imaging asset assembly script is selected based on a classification of the predefined design shape.

14. The 3D modeling method of claim 11 further comprising rendering, with the one or more processors, the photorealistic image within a first image scene.

15. The 3D modeling method of claim 14 further comprising rendering, with the one or more processors, the photorealistic image within a second image scene, the second image scene different from the first image scene.

16. The 3D modeling method of claim 11 further comprising launching, with the one or more processors, a visualization editor, the visualization editor configured to load into memory, or render on the graphical display, any one or more of the one or more CAD components, the parametric information, the parametric-based CAD model, the polygonal model, the UV coordinate mapping, the virtual product label, or the virtual 3D model.

17. The 3D modeling method of claim 16, wherein the visualization editor is configured to receive user selections to manipulate any of a shape of the virtual 3D model, a virtual material of virtual 3D model, a finish of the virtual 3D model, a color of the virtual 3D model, or the virtual product label.

18. The 3D modeling method of claim 17 further comprising generating or rendering, with the one or more processors, a new virtual 3D model based on the user selections, the new virtual 3D model representing a new product or product package corresponding to the user selections.

19. The 3D modeling method of claim 18 further comprising storing, with the one or more processors, the virtual 3D model in memory such that the virtual 3D model is accessible to the automatic imaging asset assembly script or the visualization editor, the automatic imaging asset assembly script or the visualization editor configured to generate one or more additional virtual 3D models corresponding to one or more additional real-world products or product packages.

20. A tangible, non-transitory computer-readable medium storing instructions for automatically generating photorealistic, virtual three-dimensional (3D) package and product models from 3D and two-dimensional (2D) imaging assets, that when executed by one or more processors cause the one or more processors to:
receive, by one or more processors, a user submission as selected by the user from a user interface (UI) defining a predefined design shape, the user submission causing a search for and return of a parts list comprising information selected from one or more computer-aided design (CAD) components of 2D imaging assets or 3D imaging assets as stored in a database, wherein the search causes the one or more processors to identify corresponding, new, or additional 2D imaging assets or 3D imaging assets for the returned parts lists that match or are within a given threshold of the predefined shape as selected by the user from the UI;
load, into a memory, the one or more CAD components as identified for the predefined design shape as submitted;
assemble the one or more CAD components to create a parametric-based CAD model, the parametric-based CAD model corresponding to a design for a real-world product or product package;
generate a polygonal model of the real-world product or product package based on the parametric-based CAD model, wherein one or more digital surface finish artifacts of a virtual material library, as selected from the 2D imaging assets, are applied to the polygonal model;
generate, based on parametric information of the parametric-based CAD model, a UV coordinate mapping corresponding to a virtual product label;
generate a virtual 3D model of the real-world product or product package based on the polygonal model, the UV coordinate mapping, and the virtual product label; and
render, via a graphical display, the virtual 3D model as a photorealistic image representing the real-world product or product package.

* * * * *